US012315987B2

(12) United States Patent
Tang et al.

(10) Patent No.: US 12,315,987 B2
(45) Date of Patent: May 27, 2025

(54) ANTENNA-ON-PACKAGE SYSTEM

(71) Applicant: TEXAS INSTRUMENTS INCORPORATED, Dallas, TX (US)

(72) Inventors: Yiqi Tang, Allen, TX (US); Rajen Murugan, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 211 days.

(21) Appl. No.: 17/854,197

(22) Filed: Jun. 30, 2022

(65) Prior Publication Data

US 2024/0006742 A1 Jan. 4, 2024

(51) Int. Cl.

*H01Q 1/22* (2006.01)
*H01Q 1/42* (2006.01)
*H01Q 9/04* (2006.01)

(52) U.S. Cl.

CPC ........... *H01Q 1/2283* (2013.01); *H01Q 1/422* (2013.01); *H01Q 9/0407* (2013.01)

(58) Field of Classification Search

CPC ..... H01Q 1/2283; H01Q 1/422; H01Q 9/0407
See application file for complete search history.

(56) References Cited

U.S. PATENT DOCUMENTS

2014/0184460 A1* 7/2014 Yen .......................... H01Q 9/16 343/866
2016/0056544 A1* 2/2016 Garcia ................. H01Q 9/0407 343/725

OTHER PUBLICATIONS

Kishore Ramaiah' "Antenna-on-package technology simplifies automotive in-cabin radar sensor design"; Article, EDN, edn.com; Dec. 22, 2020; 7 pgs.

* cited by examiner

*Primary Examiner* — Daniel D Chang
(74) *Attorney, Agent, or Firm* — Xiaotun Qiu; Frank D. Cimino

(57) ABSTRACT

One example includes an antenna-on-package system that includes a multi-layer antenna structure. The antenna structure includes a first conductive layer having a patch antenna and a transmission line. The transmission line extends from a feed-side edge of the patch antenna to terminate in a launch structure. The antenna structure also includes a second conductive layer having a ground reflector spaced apart from the first conductive layer by a layer of dielectric material. An integrated circuit (IC) die has a signal terminal on surface of the IC die, and a conductive signal interconnect extends through the layer of dielectric material and is coupled between the signal terminal and the launch structure.

16 Claims, 24 Drawing Sheets

2400

2500

ANTENNA-ON-PACKAGE SYSTEM

TECHNICAL FIELD

This description relates generally to communication systems, and more particularly to an antenna-on-package system.

BACKGROUND

Antennas provide a means of propagating wireless communications signals from transmitters and to receivers. As communications bandwidth increases, the size of antennas is increasingly being reduced to accommodate smaller wavelengths in a more compact form-factor. One manner of manufacturing antennas is to fabricate an antenna on an integrated circuit (IC), such as to form an antenna-on-package (AoP). Such antennas can be fabricated in a very small form-factor in a simplistic manner.

SUMMARY

One example provides an antenna-on-package (AoP) system that includes a multi-layer antenna structure. The antenna structure includes a first conductive layer having a patch antenna and a transmission line. The transmission line extends from a feed-side edge of the patch antenna to terminate in a launch structure. The antenna structure also includes a second conductive layer having a ground reflector spaced apart from the first conductive layer by a layer of dielectric material. An integrated circuit (IC) die has a signal terminal on a surface of the IC die, and a conductive signal interconnect extends through the layer of dielectric material and is coupled between the signal terminal and the launch structure.

Another example described herein includes a method includes forming a ground reflector patterned of a first conductive layer over a respective surface of an embedded die. The method also includes forming a layer of dielectric material over the first conductive layer. The method also includes forming a patch antenna and a transmission line of a second conductive layer over the layer of dielectric material, and the transmission line extends from a feed-side edge of the patch antenna to terminate in a launch structure. The method also includes forming an interconnect between the launch structure of the transmission line and a terminal of the embedded die so as to form an antenna-on-package (AoP) device.

Another example described herein includes a communication system includes a printed circuit board and an antenna-on-package (AoP) device. The printed circuit board includes an arrangement of mounting terminals. The AoP device includes a first conductive layer comprising a patch antenna and a transmission line, in which the transmission line extends from a feed-side edge of the patch antenna to terminate in a launch structure. A second conductive layer includes a ground reflector spaced apart from the first conductive layer by a layer of dielectric material. An integrated circuit (IC) die includes a signal terminal on first surface and an arrangement of connecting terminals on a second surface of the IC die opposite the first surface. A conductive signal interconnect extends through the layer of dielectric material and is coupled between the signal terminal and the launch structure. The AoP device is mounted to the printed circuit board so the connecting terminals are coupled to respective mounting terminals.

DETAILED DESCRIPTION

This description relates generally to an antenna-on-package (AoP) device, which can be formed on an integrated circuit (IC) package having one or more embedded IC dies. The IC package can be mounted on a printed circuit board (PCB) to provide a communication systems.

As an example, an AoP device includes a first conductive layer patterned to form a patch antenna and a transmission line, in which the transmission line extends from a feed-side edge of the patch antenna to terminate in a launch structure for the patch antenna. A second conductive layer includes a ground reflector that is spaced apart from the first conductive layer by a layer of dielectric material. An embedded IC die has a signal terminal (e.g., a pad or other contact), which is adapted to send and/or receive radio frequency (RF) signals relative to circuitry on the die. A conductive signal interconnect (e.g., conductive via) is formed through the layer of dielectric material and coupled between the signal terminal and the launch structure of the patch antenna. In an example, first conductive layer, which forms the patch antenna and transmission line, and the second conductive layer, which forms the ground reflector, are implemented as respective redistribution layers formed during IC packaging of a wafer-level chip scale package that ultimately forms the AoP device. To increase antenna efficiency, the antenna can be formed on a top surface of the IC package over the IC die to enable direct air radiation. For example, the AoP device is configured (e.g., tuned) to operate over a desired bandwidth, such as WR-5 (e.g., 140 GHz-220 GHz) or other frequency range according to application requirements. In some examples, the patch antenna structure can be formed directly overlying the IC die to reduce the overall package size. The AoP device further can be mounted to a printed circuit board (PCB), such as through soldering or other method according to the type of IC packaging technology.

Figure 1:
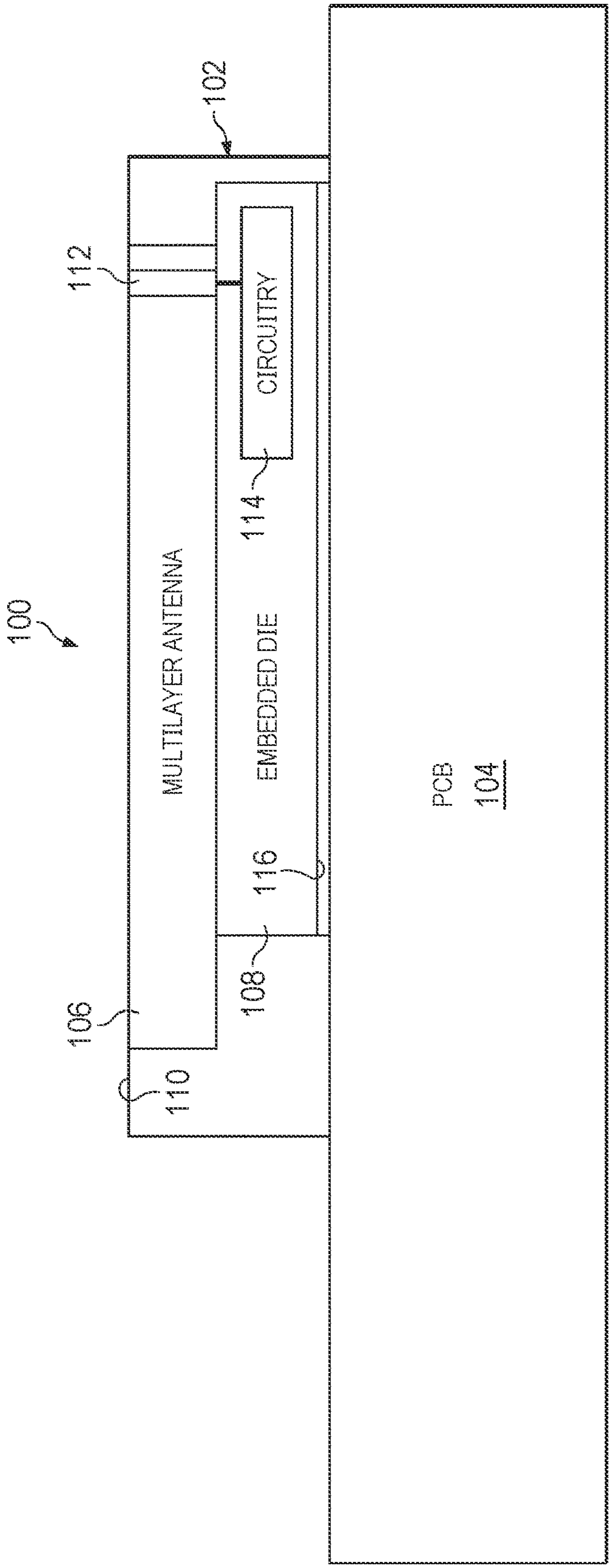
FIG. 1 is an example of a communication system.

FIG. 1 is a schematic block diagram showing an example of a communication system 100 that includes an AoP device 102 mounted to a PCB 104. The AoP device 102 includes a multi-layer antenna structure 106 formed over an embedded IC die 108. As described herein, the AoP device 102 can be formed during packaging of the IC die 108, in which the IC die is embedded within an insulating material, such as such as an Ajinomoto Build-up Film (ABF) insulating material or another insulating materials (e.g., a pre-preg material or an epoxy). The multilayer antenna includes a first conductive layer configured to form a patch antenna and a transmission line. For example, a first redistribution layer (RDL) has a conductive layer patterned to form the patch antenna and transmission line over the IC die. In one example, the RDL is formed from an electrically conductive material such as can be electroplated, sputtered, or evaporated over the layers a dielectric material or other preceding layer(s) as described herein. Example conductive materials include copper (e.g., electroplated) and aluminum (e.g., sputtered or evaporated).

The first layer structures (e.g., patch antenna and transmission line) can be formed at or near a top surface 110 of the AoP device 102 so the antenna can implement direct air radiation. The transmission line can extend from a feed-side edge of the patch antenna to terminate in a launch structure (e.g., coplanar waveguide launch). In an example, the patch antenna is configured as an E-shaped antenna having a pair of notches in the feed-side edge of the patch antenna on opposite sides of from where the transmission line extends.

The antenna structure 106 also includes a second conductive layer configured to form a ground reflector. For example, a second RDL has a respective conductive layer patterned to form the ground reflector located beneath the first layer (e.g., closer to the IC die than the first layer). The second conductive layer is spaced apart from the first conductive layer by a layer of dielectric material. A conductive signal interconnect (e.g., conductive via), shown as 112, extends through the layer of dielectric material to couple a signal terminal of the IC die to the launch structure. In an example, the first conductive layer also includes a guard ring formed around the patch antenna. The guard ring can include an opening through which the transmission line extends. The guard ring can be coupled to the ground plane by an arrangement of conductive signal interconnects (e.g., conductive vias) through the layer of dielectric material.

The IC die 108 includes circuitry 114. The circuitry 114 can be configured to perform a variety of circuit functions, including to transmit and/or receive RF signals over a range of frequencies to which the antenna is tuned. For example, the antenna 106 is configured to communicate signals having a frequency in a range from about 140 GHz to about 220 GHz (e.g., WR-5 frequency spectrum). The antenna 106 can be configured to communicate signals in other frequency ranges as may vary according to application requirements. The AoP device 102 can be mounted to the PCB 104, such as through an interconnect 116 of the IC die 108. For example, the AoP device 102 can be soldered or fastened to the PCB substrate 204 in any of a variety of ways, such as by solder bumps or another interconnect technology 116.

Figure 2A:
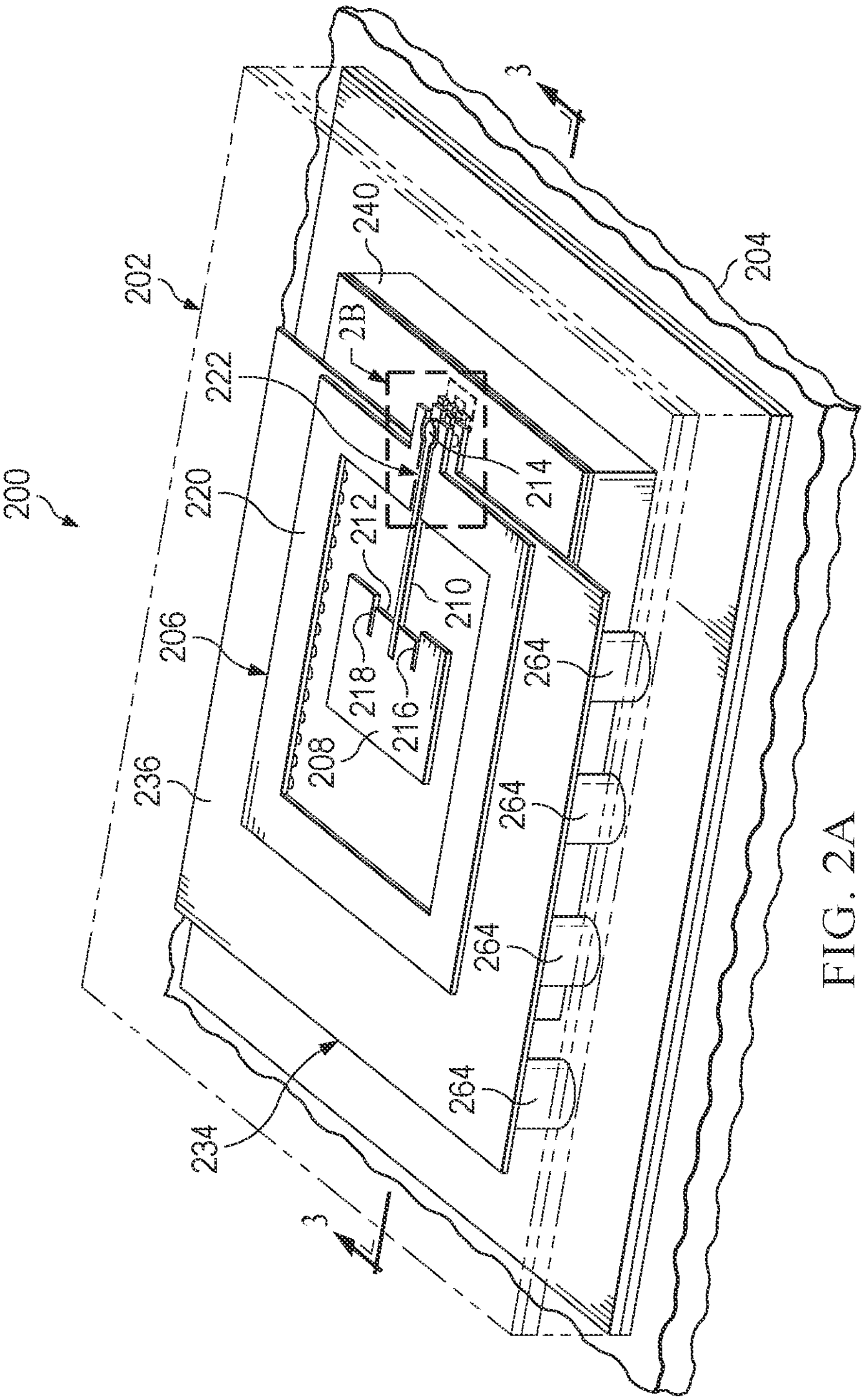
FIGS. 2A and 2B are an example of an antenna-on-package (AoP) device mounted to a PCB.
Figure 2B:
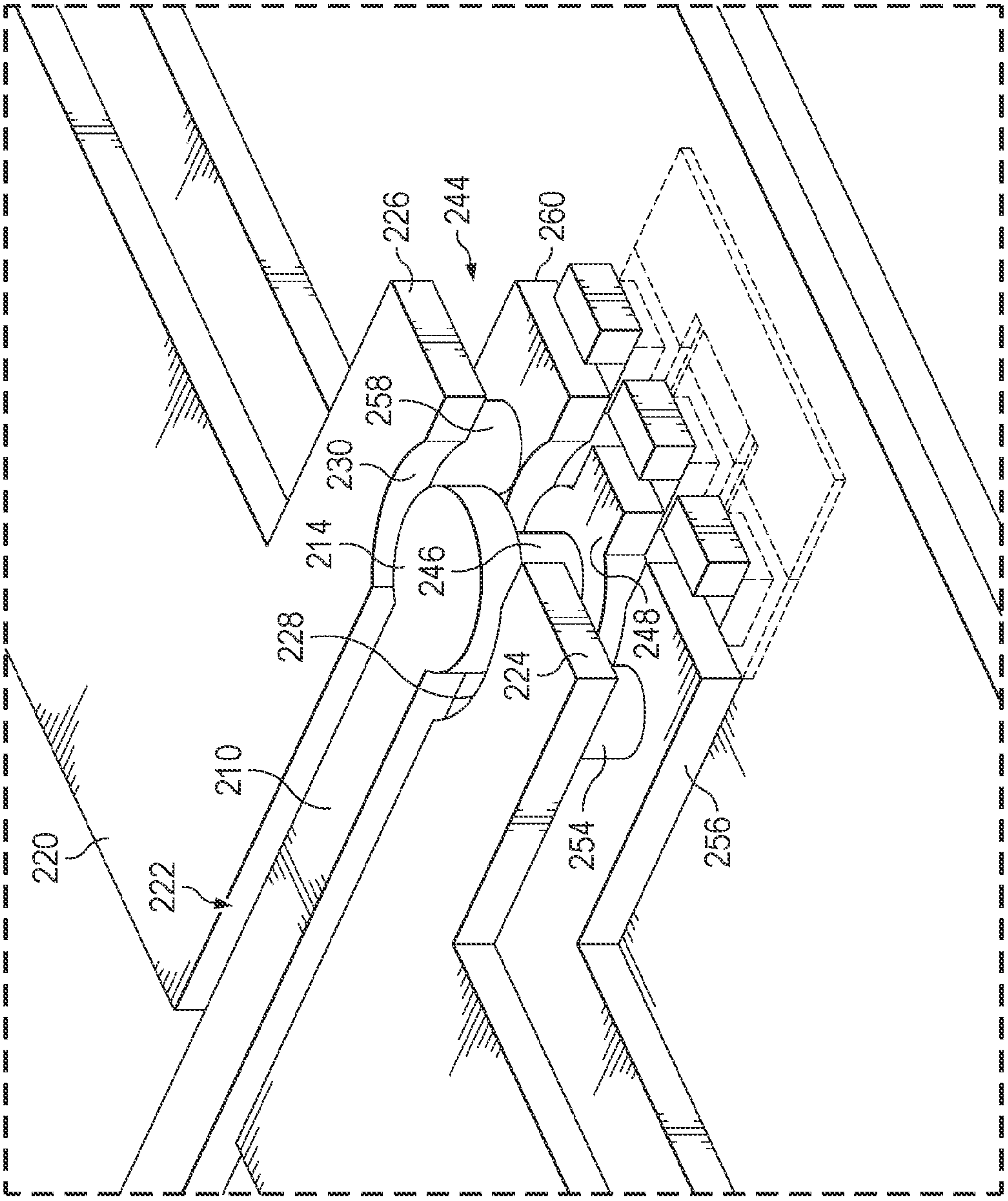

FIGS. 2A, 2B, 3A and 3B illustrate an example of a communication system 200 that includes an AoP device 202 mounted to a substrate 204, such as a PCB. The AoP device 202 is an example embodiment of the AoP device 102 of FIG. 1. The AoP device 202 includes a first conductive layer 206 that includes a patch antenna 208 and a transmission line 210. The transmission line 210 can extend from a feed-side edge 212 of the patch antenna to terminate in a launch structure (e.g., coplanar waveguide launch) 214. In the example of FIGS. 2A and 2B, the patch antenna 208 is configured as an E-shaped antenna having a pair of notches 216 and 218 in the feed-side edge 212 of the antenna on opposite sides of a location from where the transmission line 210 extends.

The first conductive layer 206 can also include a guard ring 220 formed configured to surround the patch antenna 208. The guard ring 220 can include an opening 222 between spaced apart edges of opposing guard ring end portions 224 and 226. The guard ring end portions 224 and 226 can extend (e.g., as legs) from a feed-side of the guard ring 220 in a direction parallel to the transmission line 210. The transmission line 210 thus can extend longitudinally at least partially through the opening 222.

The AoP device 202 also includes a second conductive layer 234 configured to form a ground reflector 236. For example, the second conductive layer is a second RDL that is patterned to form a rectangular ground reflector 236 located beneath the first layer (e.g., closer to an IC die 240 than the first layer). The second conductive layer 234 is spaced apart from the first conductive layer 206 by a layer of dielectric material 242. The area of the ground reflector 236 is at least as large and can be larger than an area of the guard ring 220. The ground reflector 236 also can have a comparable rectangular configuration to the periphery of the guard ring 220. For example, the plane of the ground reflector 236 extends outwardly beyond edges of the ground reflector (e.g., in the x- and y-directions) along each edge of the ground reflector except a feed-side edge thereof. As shown in the example of FIGS. 2 and 3, an arrangement of conductive interconnects (e.g., conductive vias) 241 are distributed along a periphery of the guard ring 220 and extend through the layer of dielectric material 242 to couple the guard ring to the ground reflector 236 around the antenna 208.

In an example, the launch structure 214 has a circular shape, and the guard ring end portions 224 and 226 include opposing curved recessed edges 228 and 230 along opposite sides of the circular-shaped launch structure 214 so edges of the guard ring end portions 224 and 226 surround the circular-shaped launch structure. The AoP device 202 thus includes a circular-shaped via feed structure 244 that includes the launch structure 214 of the first conductive layer 206 and a conductive signal interconnect 246. The signal interconnect 246 can be formed as a conductive via along a Z axis orthogonal to a surface of conductive layer 206, which extend through the layer of dielectric material 242 and is coupled to a respective terminal 248 patterned in the second conductive layer 234. The signal interconnect 246 is electrically isolated from the ground reflector 236. The patterned terminal 248 of the second conductive layer 234 is coupled to a respective signal terminal (e.g., an electrically conductive pad or other contact) 250, which is coupled to circuitry of the IC die 240 through an opening 252 in the second conductive layer 234 (e.g., RDL) and through a passivation coating or layer 251 on the die 240. In some examples, a polyimide layer 253 can be formed over the passivation layer 251.

In a further example, the feed structure 244 is implemented as a ground-signal-ground (GSG) launch. For example, the feed structure 244 includes a first ground interconnect (e.g., conductive via) 254 that extends from a guard ring end portion 224 through the layer of dielectric material 242 and is coupled to a respective ground terminal 256, which patterned in the second conductive layer 234. The feed structure includes another ground element having a second ground interconnect 258 that extends from the other guard ring end portion 226 through the layer of dielectric material 242 and is coupled to a respective ground terminal 260 patterned in the second conductive layer 234.

The ground terminals 256 and 260 of the second conductive layer 234 can be coupled to a respective ground terminal of the IC die 240.

As described above, the AoP device 202 can be mounted to a substrate (e.g., PCB) 204, such as through a solder bumps or another interconnect technology of the packaged die 240. The AoP device 202 also includes conductive vias 264 coupled between the antenna structure and one or more other layers 266 and 268 of the integrated package structure. For example, the vias 264 can be configured to carry ground or other signals between the antenna and circuitry of the package, such as through conductive traces implemented on or within the respective layers 266 and 268.

Figure 4:
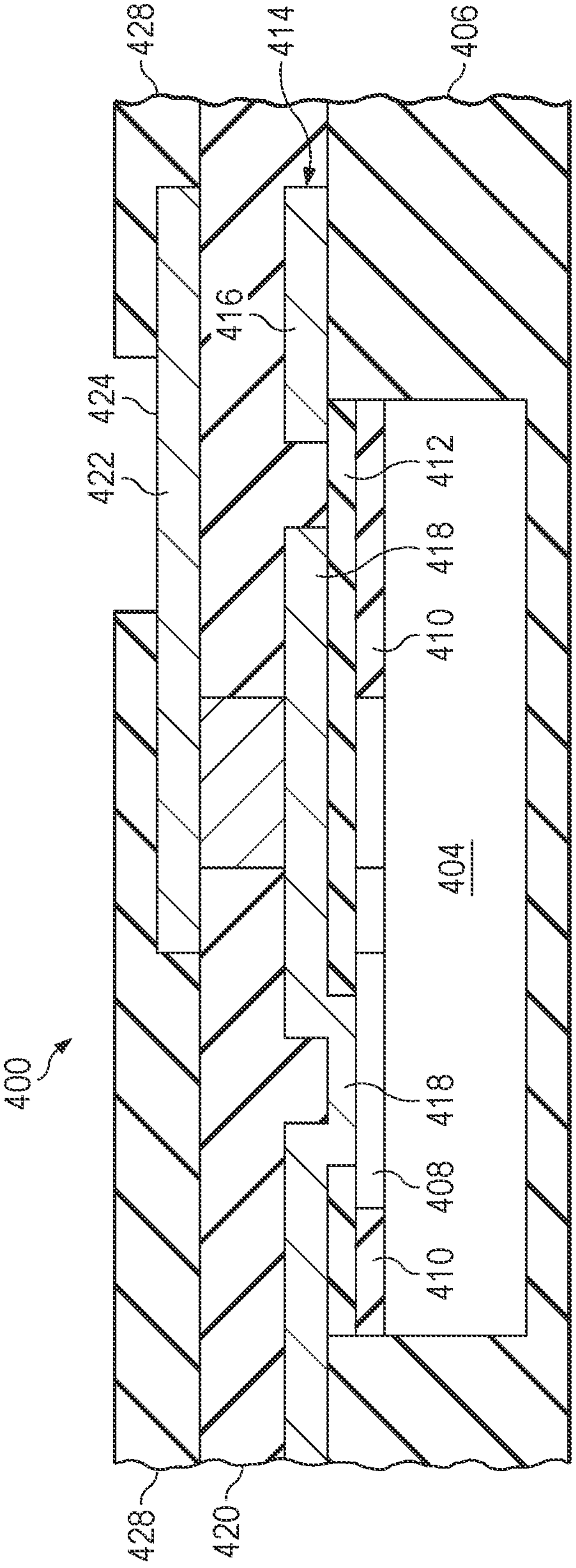
FIG. 4 is a cross-sectional view showing part of another example AoP device.

FIG. 4 is a cross-sectional view showing another example of part of an AoP device 400. The AoP device 400 includes an antenna structure formed over a die 404 embedded within a volume of an insulating material 406, such as an ABF insulating material. The cross-sectional view in the example of FIG. 4 is along a similar view as the enlarged portion of FIG. 3B, such as to show structural features near a signal launch. For example, a signal terminal (e.g., a pad) 408 is formed on the die 404, such as patterned conductive material (e.g., copper or aluminum), by etching through passivation and polyimide layers 410 and 412, respectively. A conductive RDL 414 (e.g., the second conductive layer 234) is formed over the polyimide layer 412. For example the redistribution layer 414 is patterned to form a ground reflector 416 (e.g., ground reflector 236) and conductive traces 418 electrically isolated from the ground reflector and coupled to the signal terminal 408.

A layer of dielectric material 420 is formed over the patterned redistribution layer 414, such as described herein. Another conductive RDL 422 is formed over the dielectric material layer 420. As described herein, the RDL 422 is patterned to form a transmission line 424 (e.g., transmission line 210) and a patch antenna (e.g., patch antenna 208). A conductive via 426 is formed through the dielectric layer 420 to couple a launch at the distal end of the transmission line 424 to the conductive trace 418. A solder mask 428 of an insulating material photoresist is deposited over the RDL 422 and exposed portions of the dielectric material layer 420. The opening in the solder mask leaves the antenna structure exposed to promote a desired radiation pattern for the antenna at the top of the AoP device 400.

Figure 3A:
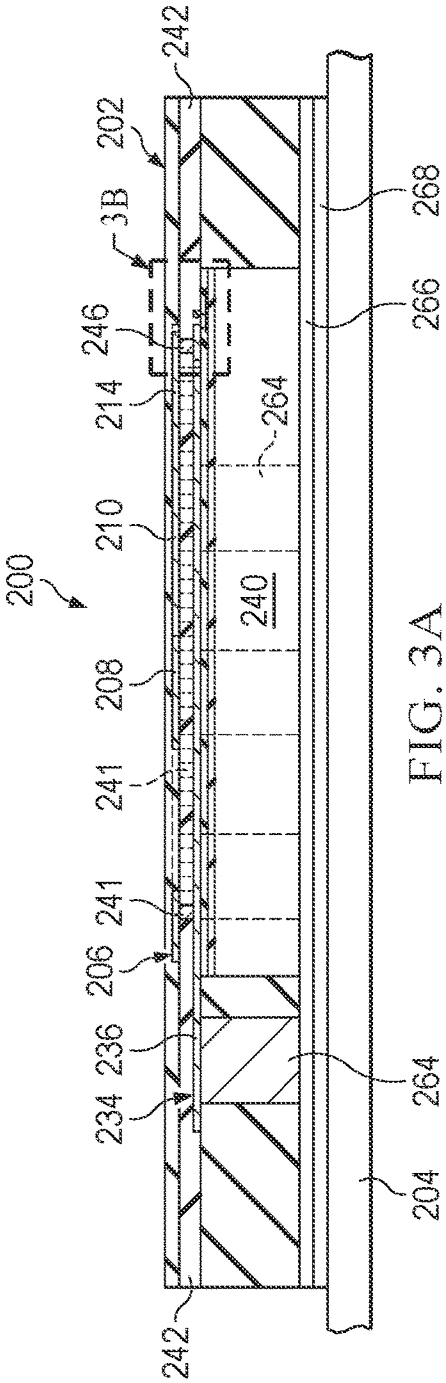
FIGS. 3A and 3B are cross-sectional views showing part of the AoP device of FIG. 2A, including FIG. 3B showing an enlarged view of a launch structure.
Figure 3B:
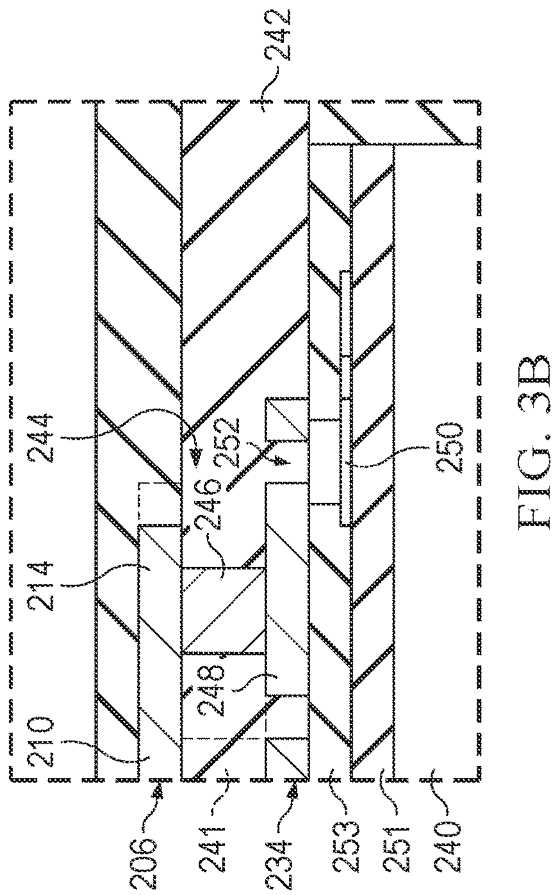
Figure 5:
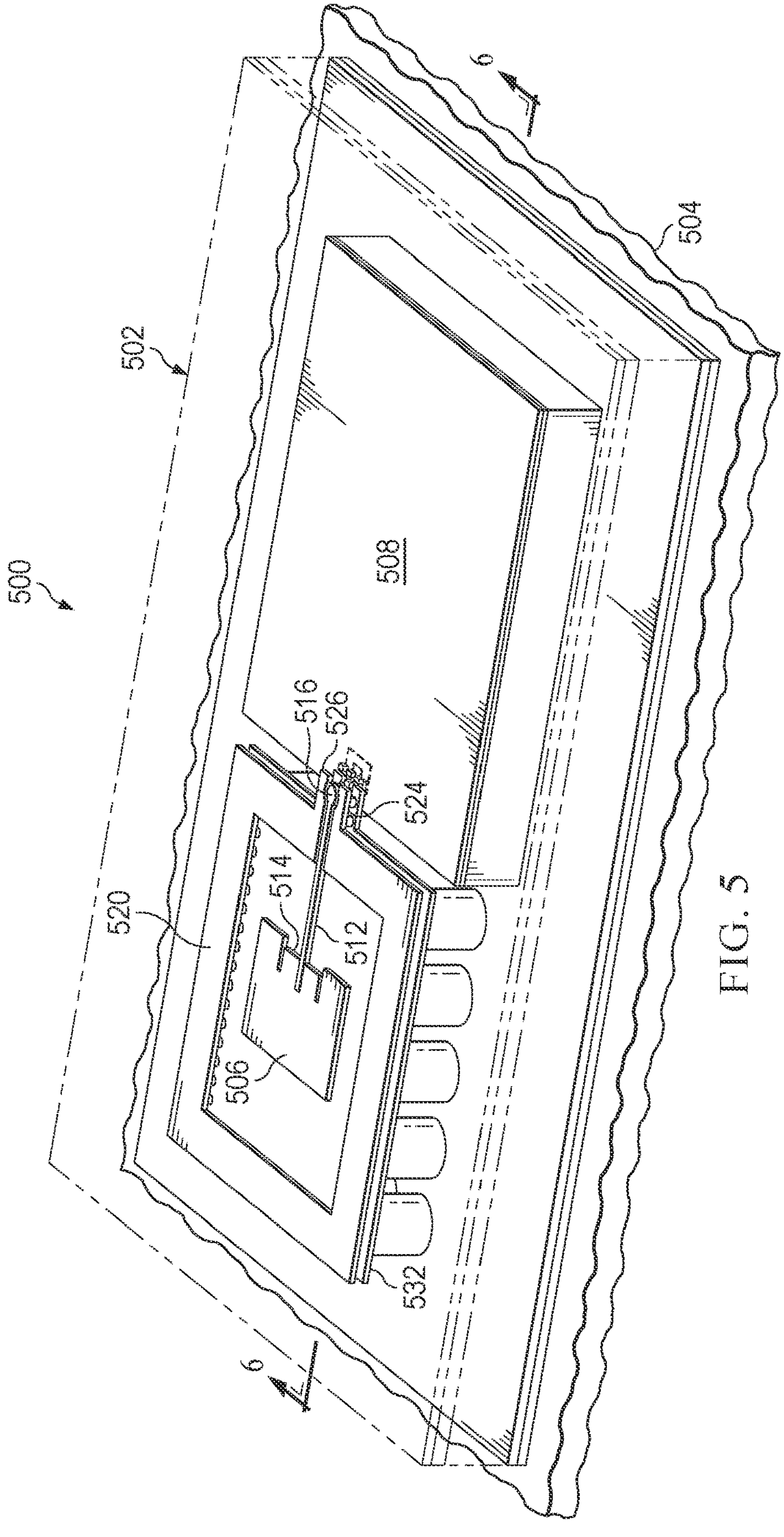
FIG. 5 is another example of an AoP device mounted to a PCB.
Figure 6:
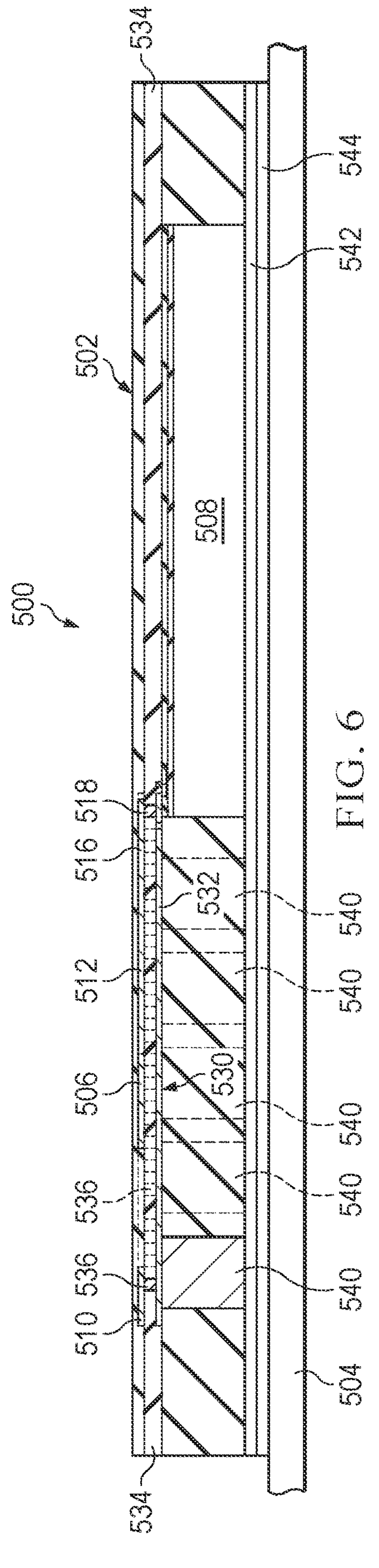
FIG. 6 is a cross-sectional view showing part the AoP device of FIG. 5.

FIGS. 5 and 6 show different views of another example a communication system 500 that includes an AoP device 502 mounted to a PCB 504. The AoP device 502 is another example embodiment of the AoP device 102 of FIG. 1. The AoP device 502 is shown having a similar configuration and can be fabricated using the same process flow as the example of FIGS. 2 and 3. That is, in that the AoP device 502 includes an antenna 506 and an embedded IC die 508. However, in the example of FIGS. 5 and 6 the antenna 506 is positioned laterally relative to the embedded IC die 508, whereas in the example of FIGS. 2A, 2B, 3A and 3B, the antenna 208 is positioned directly over the embedded IC die 240. For example, as shown in FIGS. 2A and 3A the patch antenna 208 has a periphery positioned directly over and within a virtual projection extending orthogonally from a periphery of the IC die 240. The offset configuration of the AoP device 502 in FIGS. 5 and 6 provides more space to route signal inputs/outputs and power (e.g., through the packaging material in which the die 508 is mounted), which can also reduce noise due to the reduced signal line density, but at the cost of needing a larger package size. Thus, the AoP device 202 in the example of FIGS. 2A, 2B, 3A, and 3B can provide a more compact package having reduced surface area, though has a higher signal line density.

The AoP device 502 includes a first conductive layer 510 (e.g., an RDL) that is patterned to form the patch antenna 506 (e.g., an E-shaped patch antenna) and a transmission line 512. The transmission line 512 can extend from a feed-side edge 514 of the patch antenna to terminate in a launch structure (e.g., coplanar waveguide launch) 516. In an example, as shown in the cross-sectional view of FIG. 6, the launch structure 516 extends over a portion of IC die 508, and an interconnect (e.g., a conductive via extending along a Z axis) 518 couples the transmission line 516 to a respective signal terminal of the IC die 508. In an example, the launch structure 516 can be implemented as a GSG launch, such as shown in the enlarged view of FIG. 2B.

The first conductive layer 510 can also include a guard ring 520 formed configured to surround the patch antenna 506. The guard ring 520 can include an opening between spaced apart edges of opposing guard ring end portions 524 and 526, such as described herein (see, e.g., the enlarged view of FIG. 2B). The transmission line 512 thus can extend longitudinally at least partially through the opening so the transmission line is electrically isolated from the guard ring 520.

The AoP device 502 also includes a second conductive layer 530 configured to form a ground reflector 532. For example, the second conductive layer 530 is a second RDL that is patterned to form a planar sheet ground reflector 532 and one or more conductive traces (not shown, but see, e.g., FIGS. 2 and 3) beneath the first conductive layer 510. The first and second conductive layers 510 and 530 are spaced apart from each other by a layer of dielectric material 534. The area of the ground reflector 532 can have an area that is at least commensurate (e.g., approximately the same size or larger) with an area of the guard ring 520, and have a similar shape. An arrangement of conductive interconnects (e.g., conductive vias) 536 are distributed along a periphery of the guard ring 520 and extend through the layer of dielectric material 534 to couple the guard ring to the ground reflector 532. The signal via 518 also extends through the dielectric material between the respective layers 510 and 530.

As described herein, the AoP device 502 can be mounted to the PCB 504, such as through a solder bumps or another interconnect technology. The AoP device 202 also includes conductive vias 540 coupled between the antenna structure and additional layers 542 and 544 within the package. For example, the vias 540 can be implemented to connect to ground, power or carry other signals between the antenna and other circuitry of the integrated system package 502.

Figure 7:
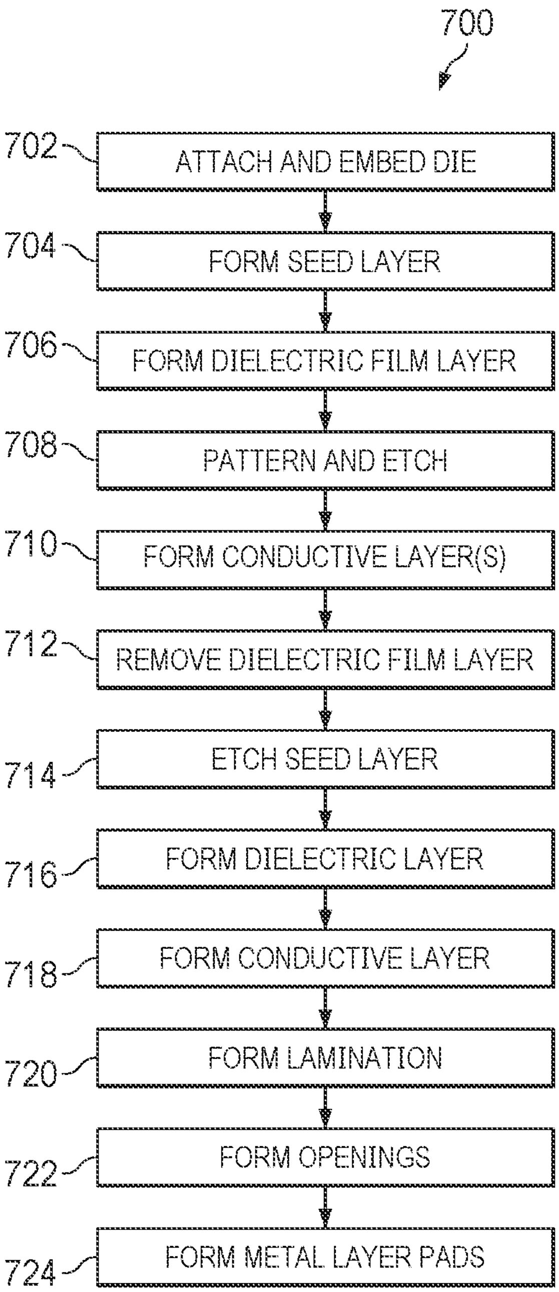
FIG. 7 is a flow diagram showing an example of a method for fabricating an AoP system.
Figure 8:
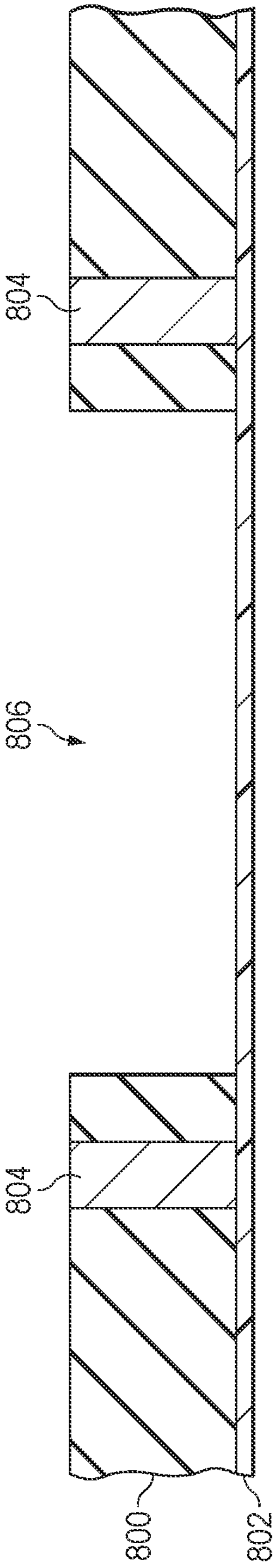
FIGS. 8-23 are cross-sectional views of an AOP device during the method of fabrication.

FIG. 7 is a flow diagram illustrating an example method 700 of fabricating an AoP device, such as the devices of FIGS. 1-6. The method 700 can be performed, for example, as part of a larger process of packaging the IC die, and is not to be limited to the order or actions described herein. The method 700 is described in relation to the cross-sectional views of FIGS. 8-21, which show an example processing progression for forming an AoP device according to the method.

Figure 9:
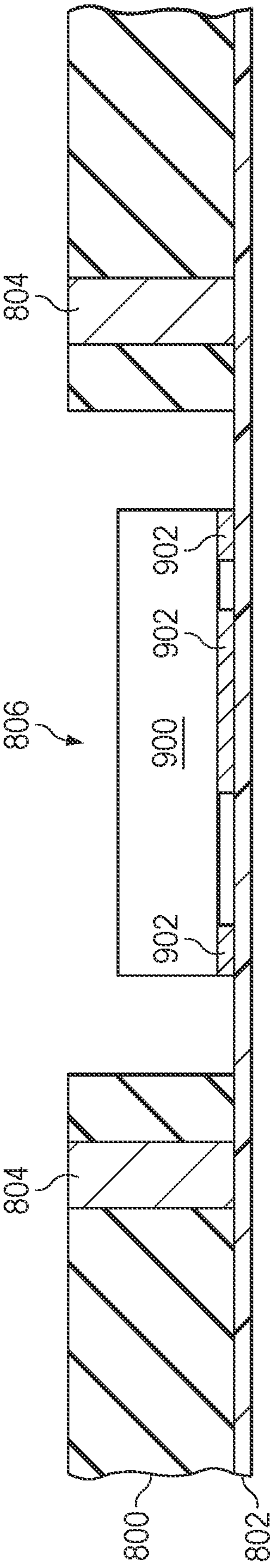
Figure 10:
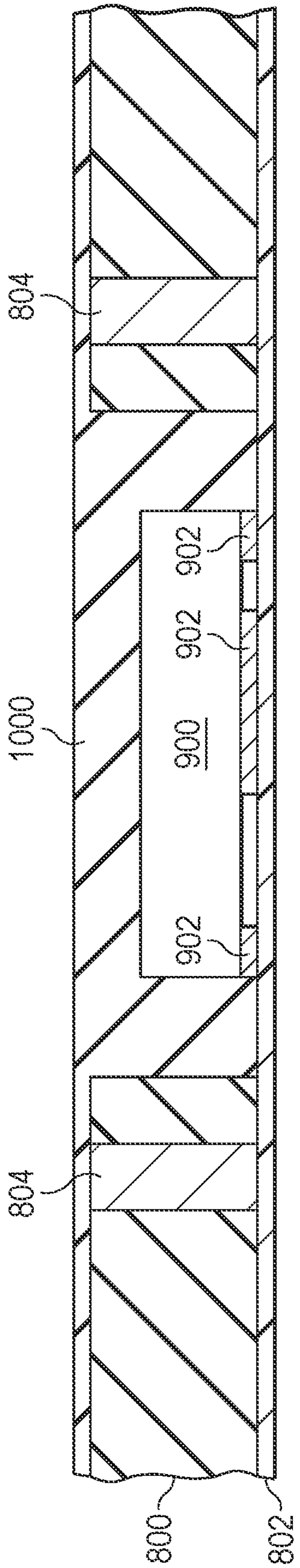
Figure 11:
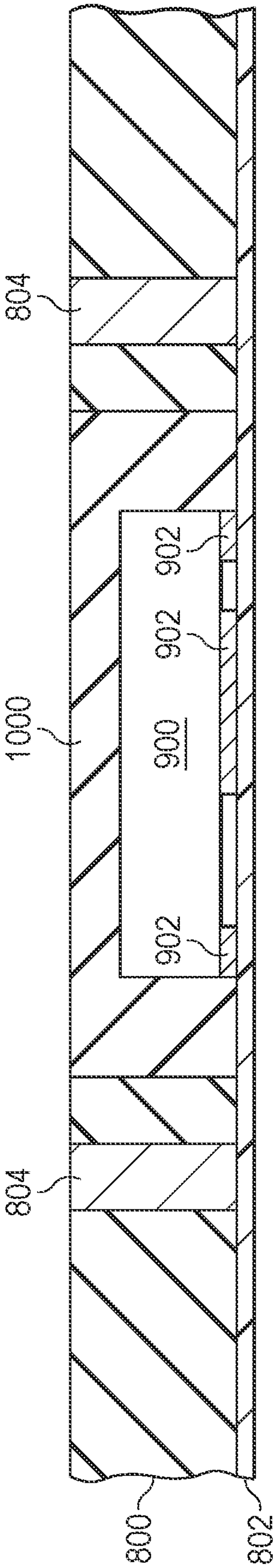
Figure 12:
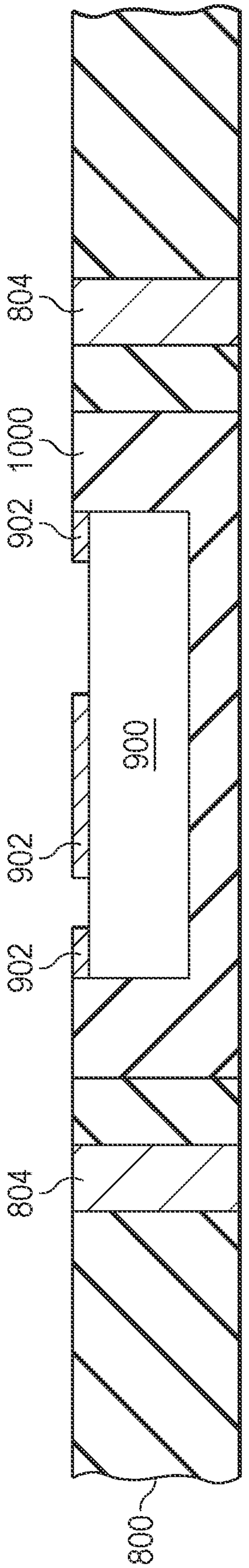

At 702, the method 700 includes attaching and embedding one or more dies within a frame. For example, as show in FIG. 8 a frame (also referred to as a core) 800 can be attached to an adhesive tape 802, such as by laminating the tape to the frame. The frame 800 can include a plurality of conductive vias, such as etched along a periphery of the frame (e.g., vias 264 or 540). Cavities 806 can also be cut into the frame (e.g., prior to attaching to the tape) between respective core. As shown in FIG. 9, a die 900 can be placed into a respective cavity 806. The die 900 can include an arrangement of conductive terminals (e.g., pads or pillars) 902 along a respective front surface of the die. The configuration of terminals 902 can vary depending on the type of die. In FIG. 10, an insulating material 1000, such as ABF, is applied (e.g., using a vacuum laminator) to laminate onto a backside of the die 900 and to fill gaps between the die and frame 800. The lamination can be cured to fix the dies in the cavity 806 with respect to the frames. As shown in FIG. 11, a top portion of the lamination can be removed, such as by plasma cleaning (e.g., treating with oxygen plasma) or another cleaning process. In FIG. 12, the adhesive tape has been removed and the intermediate structure is flipped over so the conductive terminals are at the top. FIG. 12 thus shows an example of an embedded die on which an antenna structure can be formed, as described herein.

Figure 13:
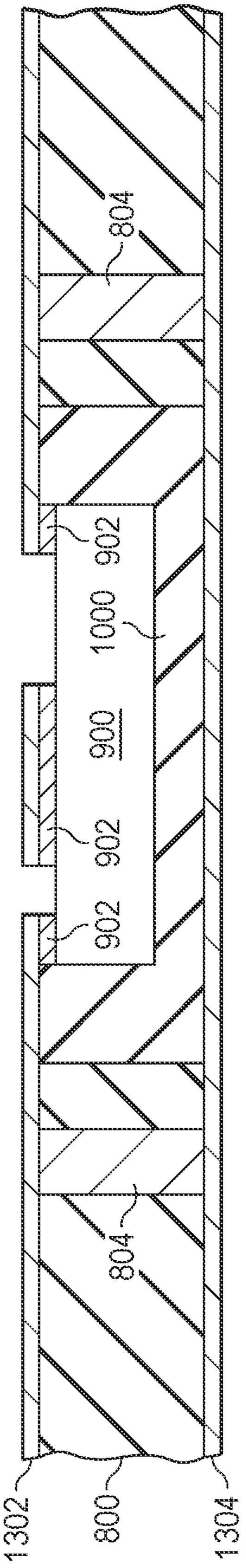
Figure 14:
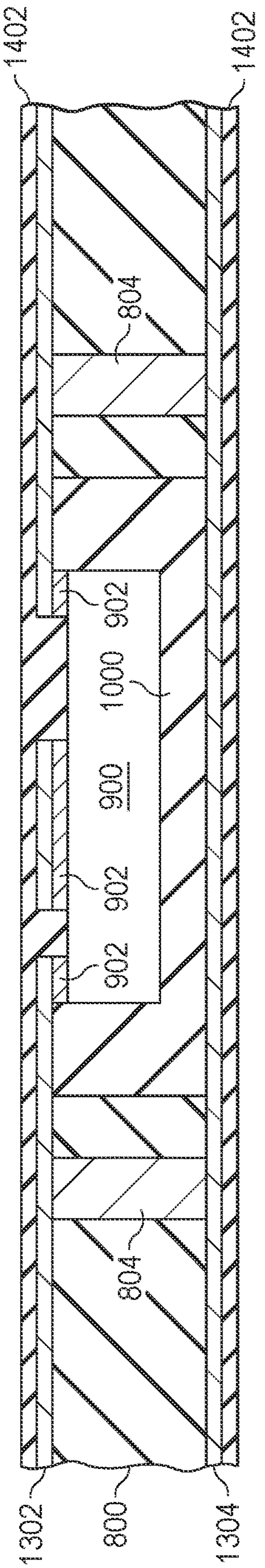
Figure 15:
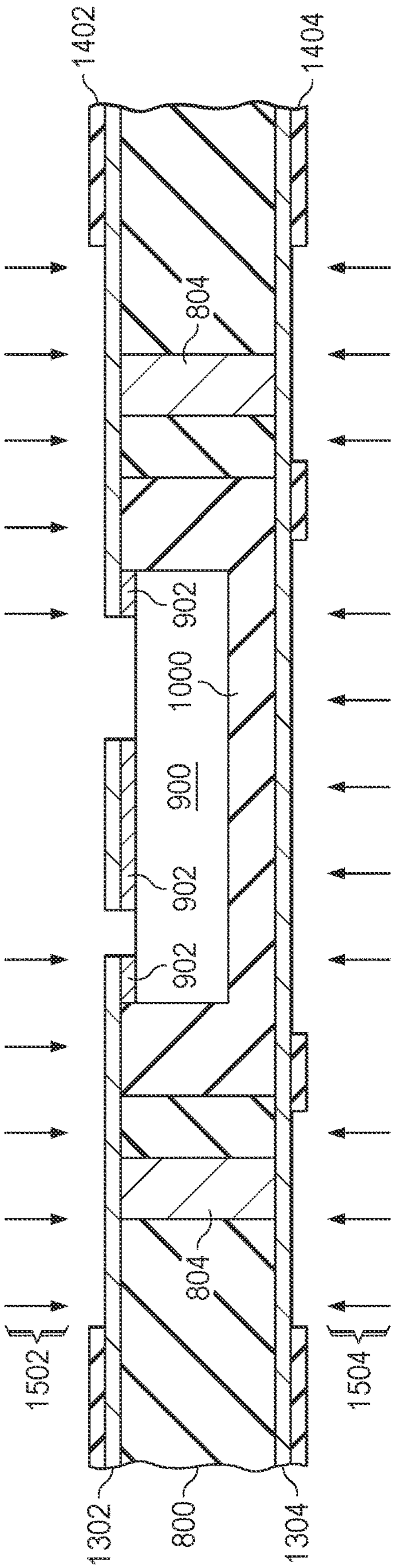

At 704, conductive seed layers are formed along both surfaces. For example, as shown in FIG. 13, seed layers 1302 and 1304 are deposited on the respective surfaces, such as by spin coating or another deposition process. At 706, a dielectric film layer is formed. For example, as shown in FIG. 14, respective dielectric film layers 1402 and 1404 are formed over the respective seed layers 1302 and 1304. The dielectric film layers 1402 and 1404 can be applied as a coating using a vacuum lamination or another process. At 708, the dielectric film is patterned and etched. For example, as shown in FIG. 15, portions of the dielectric film can be removed on respective sides, such as by selective etching through a patterned hardmask, shown schematically at 1502.

Figure 16:
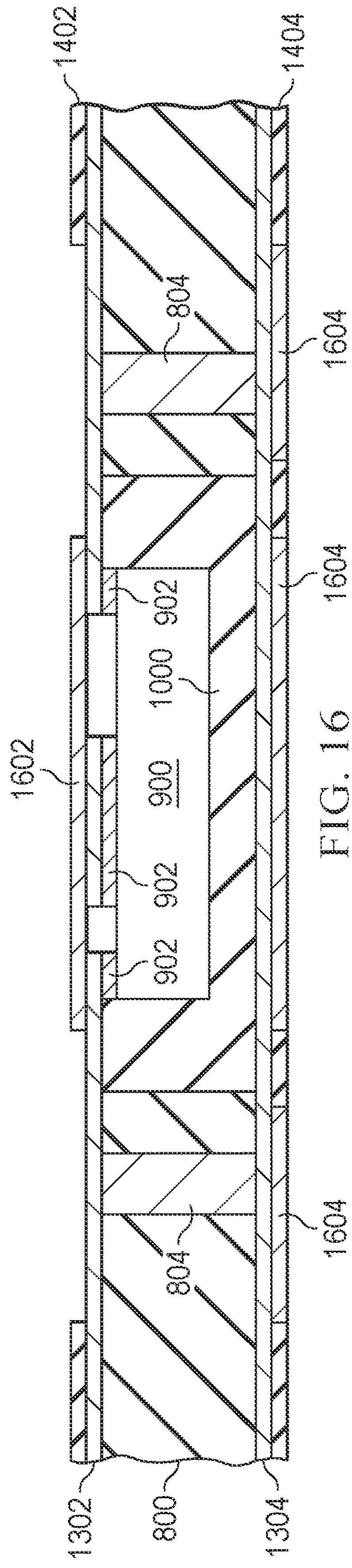
Figure 17:
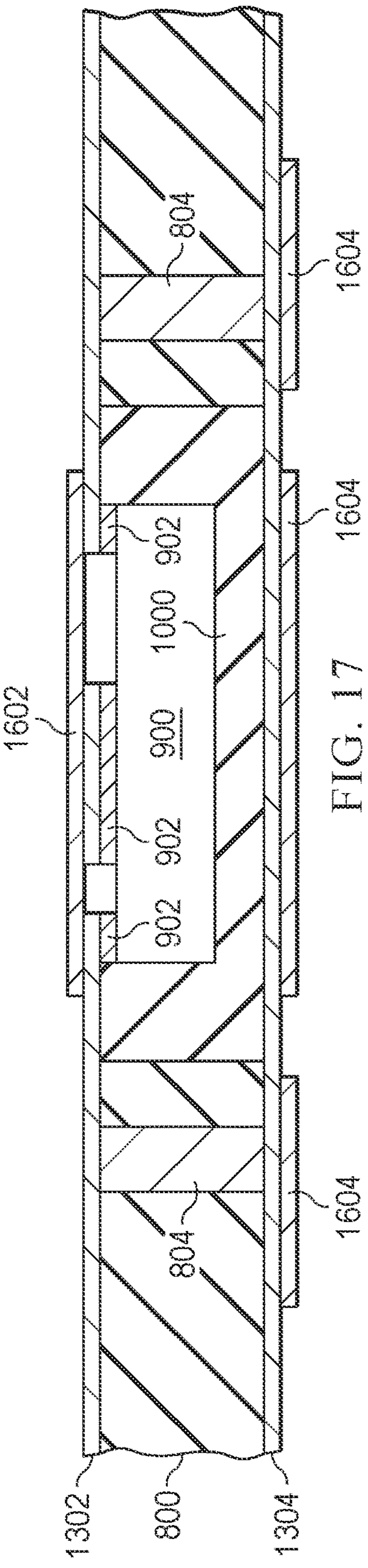
Figure 18:
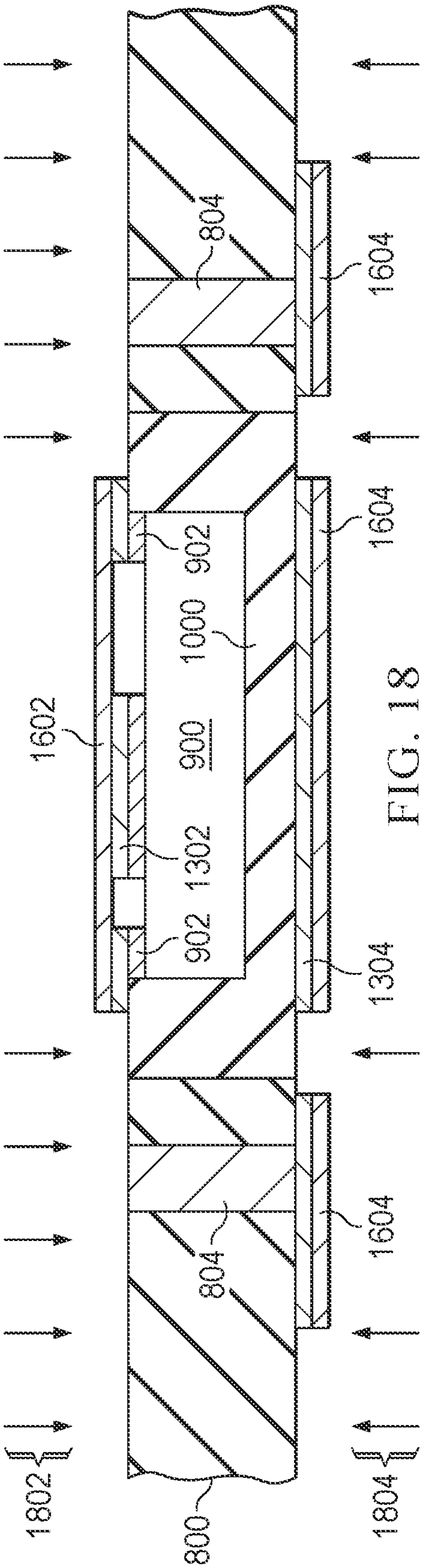

At 710, respective conductive layers are formed over the portions of the seed layer exposed following removal of the dielectric film (at 708). For example, as shown in FIG. 16, respective conductive layers 1602 and 1604 are formed on the exposed surfaces over the seed layers where the dielectric film layers 1402 and 1404 had been removed. In one example, the conductive layers 1602 and 1604 are formed as an electrically conductive RDLs, such as including a layer of copper that is electroplated onto the seed layers 1302 and 1304. In another example, the conductive RDLs 1602 and 1604 can include aluminum that is sputtered or evaporated onto the seed layers 1302 and 1304. The RDL 1602 can define a ground plane of an antenna structure being formed. The other RDL 1604 can include respective traces coupled to terminals of the IC die and routing traces in the respective vias 804 for carrying signals and/or power. At 712, the remaining dielectric film is removed, such as by etching (e.g., a wet cleaning or ashing process). Thus, as shown in FIG. 17, the dielectric film layers 1402 and 1404 have been removed.

Figure 19:
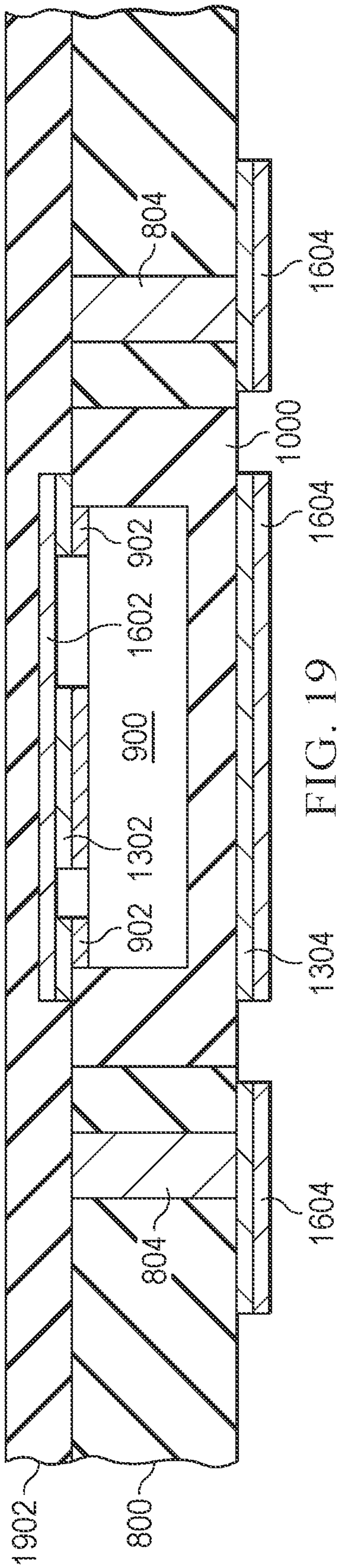
Figure 20:
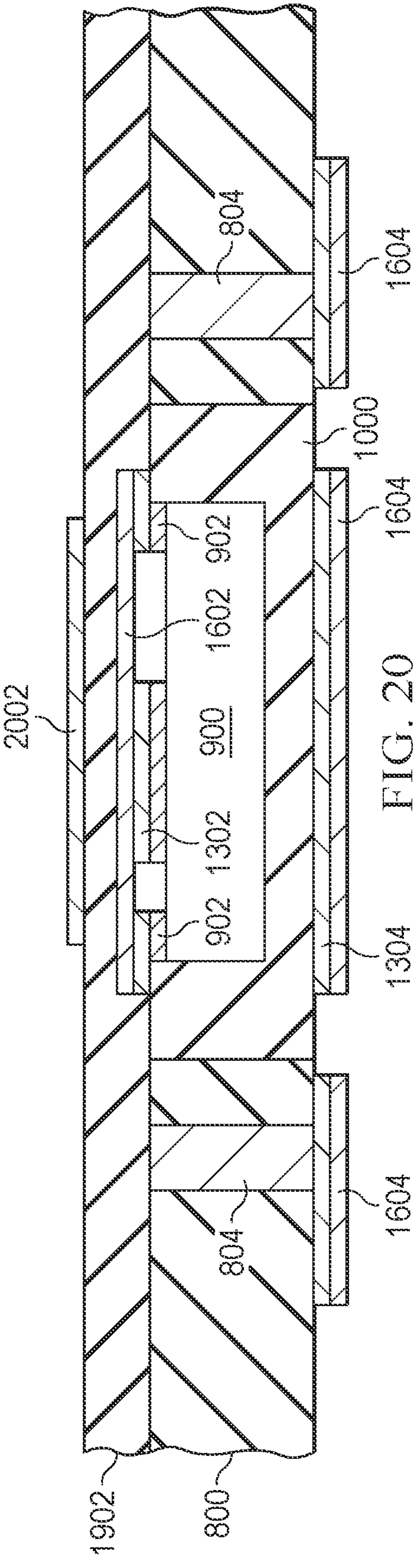

At 714, the seed layer is etched. For example, in areas where the conductive RDLs 1602 and 1604 do not cover the seed layers 1302 and 1304, the exposed seed layer can be etched, such as shown schematically at 1802 and 1804 in FIG. 18. At 716, a dielectric layer is formed over the RDL at the top surface. For example, as shown in FIG. 19, the dielectric layer 1902 is formed over the RDL ground plane layer. At 718, another conductive layer is formed over portions of the dielectric layer (formed at 716). For example, as shown in FIG. 20, the conductive layer 2002 is formed as an electrically conductive RDL patterned over the dielectric layers 1902, such as to form an E-shaped antenna, a transmission line and a guard ring. As described herein, the guard ring can be electrically coupled to the ground plane of RDL 1602 through conductive vias formed through the dielectric layer 1902, such as described herein. Additionally, the launch structure of the transmission line can be electrically coupled to a feed through a respective conductive via formed through the dielectric layer 1902. The RDL 2002 can be formed copper or aluminum, such as described with respect to the RDL 1602.

Figure 21:
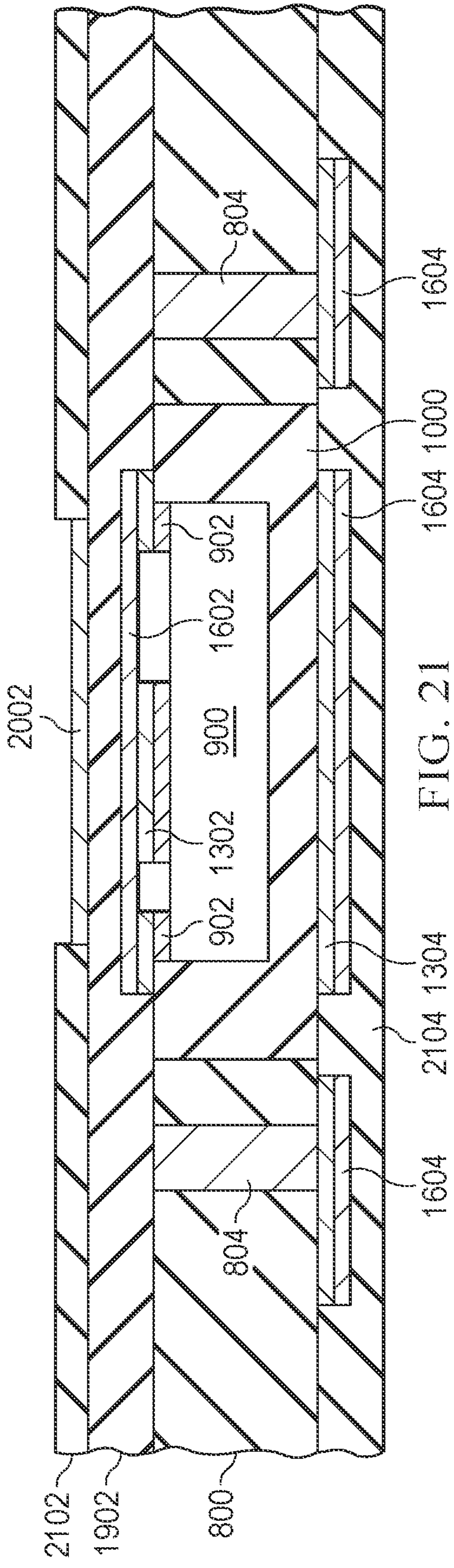
Figure 22:
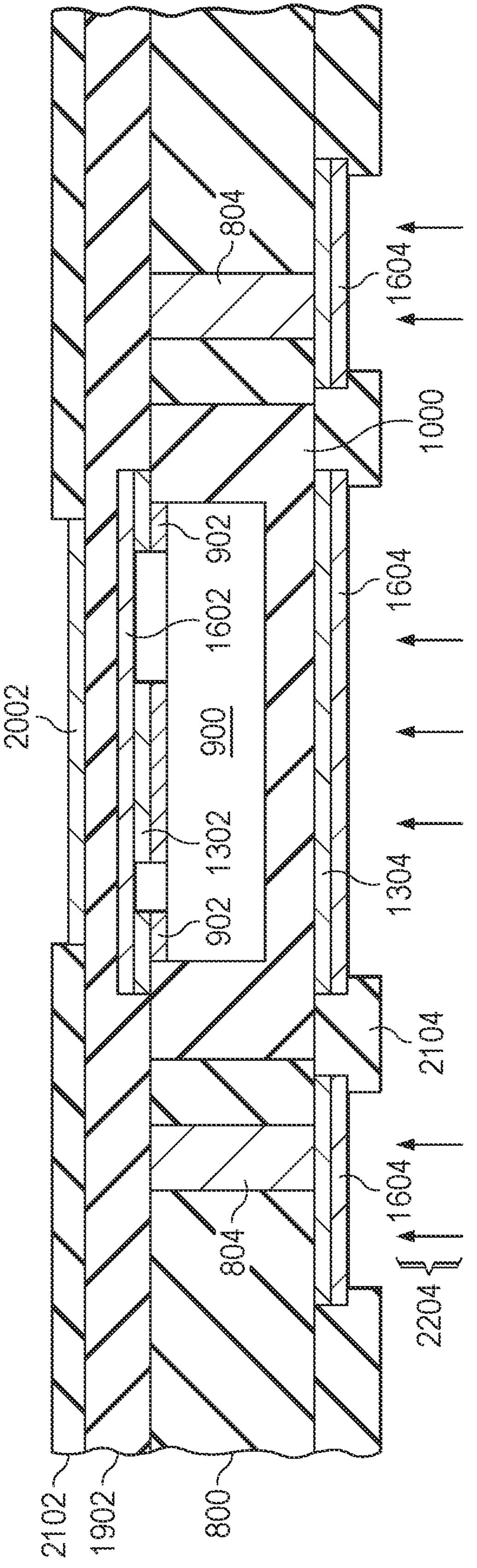
Figure 23:
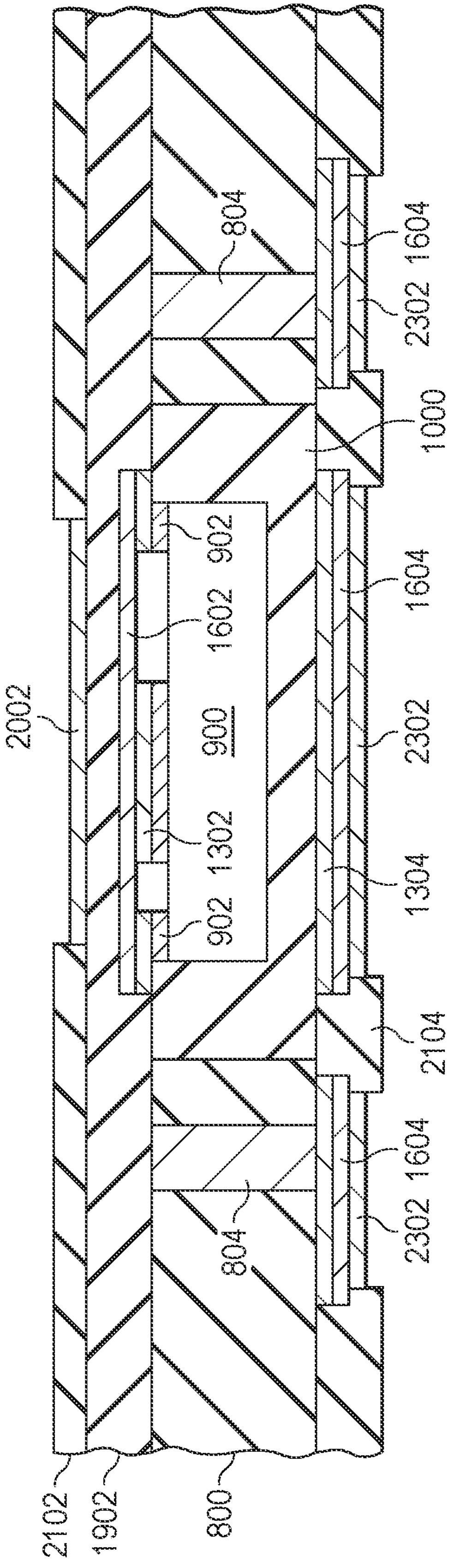

At 720, laminated dielectric layers can be formed over the respective surfaces of the package, such as shown at 2102 and 2104 in the example of FIG. 21. At 722, respective openings are formed through the lamination layers and, at 724 metal layer pads are formed through the openings over the bottom RDL 1604. For example, as shown at 2204 in FIG. 22, selective portions of the laminated dielectric layers can be etched away to expose the respective conductive layer (RDLs) 1604. FIG. 23 shows an example of pad surfaces 2302 being formed over the respective conductive layer 1604, such as by electroplating (e.g., for copper pads) or by sputtering or evaporating (e.g., for aluminum pads). Metal pads are not formed over the top RDL 1602 to enable a desired radiation pattern for the antenna structure that is formed thereon. The AoP device can be formed in a batch in which respective packages can be removed from the frame through a package separate process. Each AoP device can then be mounted on a respective PCB, such as described herein.

Figure 24:
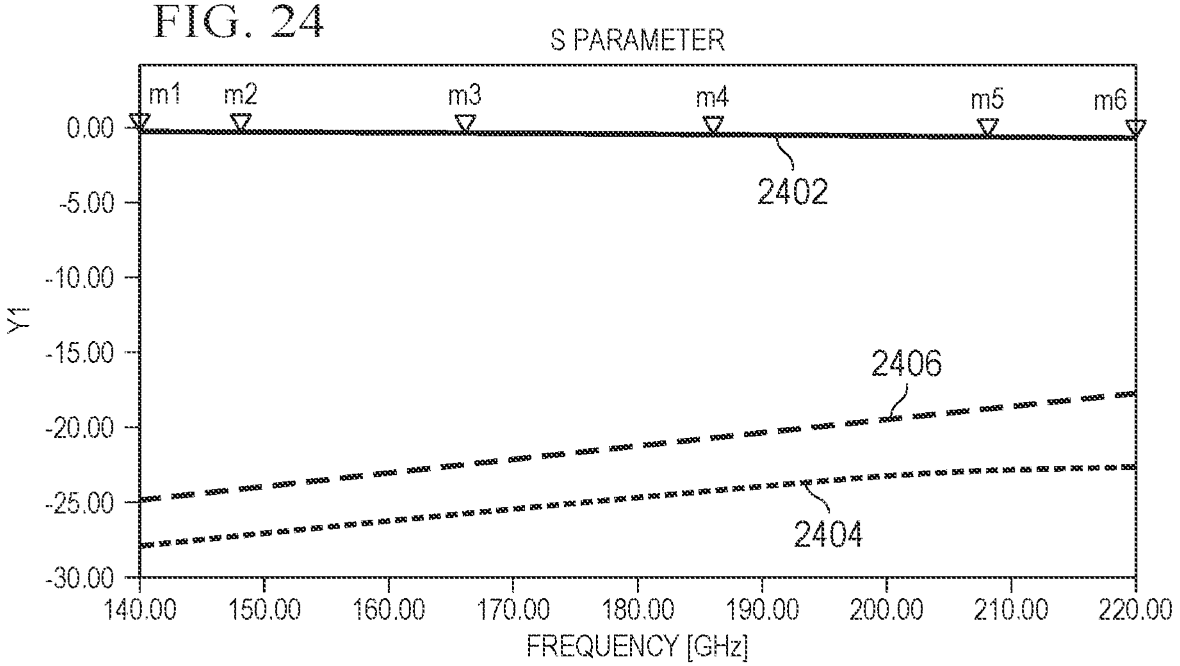
FIG. 24 is a graph showing insertion loss and return loss for an example AoP device.

FIG. 24 is a graph 2400 showing plots 2402, 2404 and 2406 for insertion loss and return loss for an example AoP device (e.g., device 202 or 502). The plot 2402 shows insertion loss of the feed structure at less than about −0.5 dB. The plot 2404 shows return loss for an S11 scattering parameter, and the plot 2406 shows return loss for an S22 scattering parameter. The example AoP device thus can achieve better than −15 dB return loss.

Figure 25:
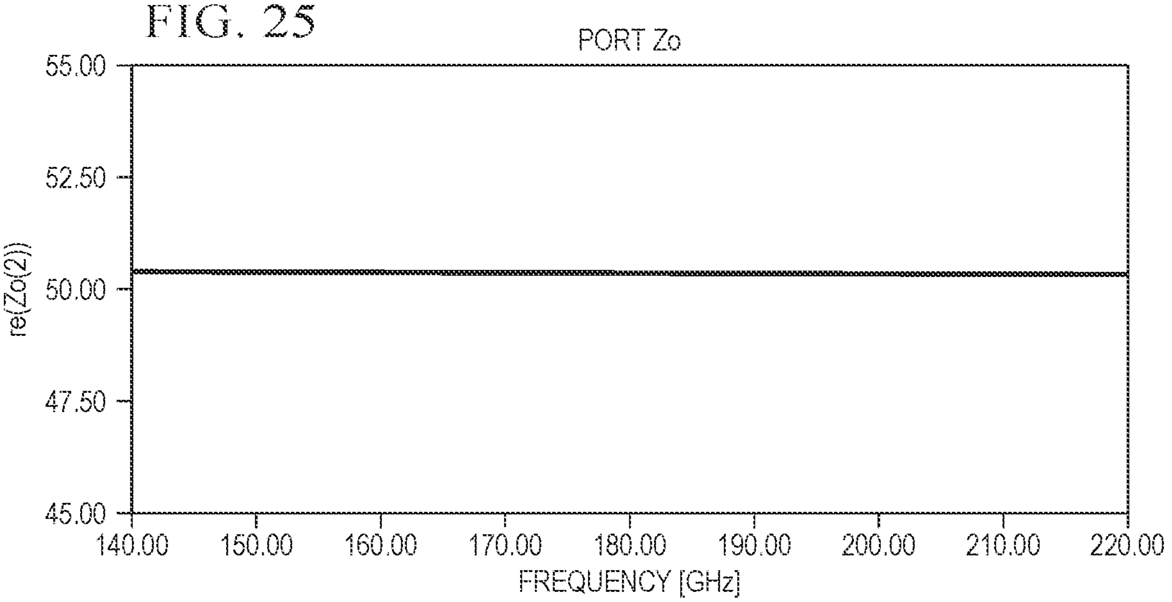
FIG. 25 is a graph showing impedance matching for an AoP device.

FIG. 25 is a graph 2500 showing impedance matching for a port of an example AoP device (e.g., device 202 or 502). The graph demonstrates a well-controlled impedance of about 50 Ω for the WR-5 band.

Figure 26:
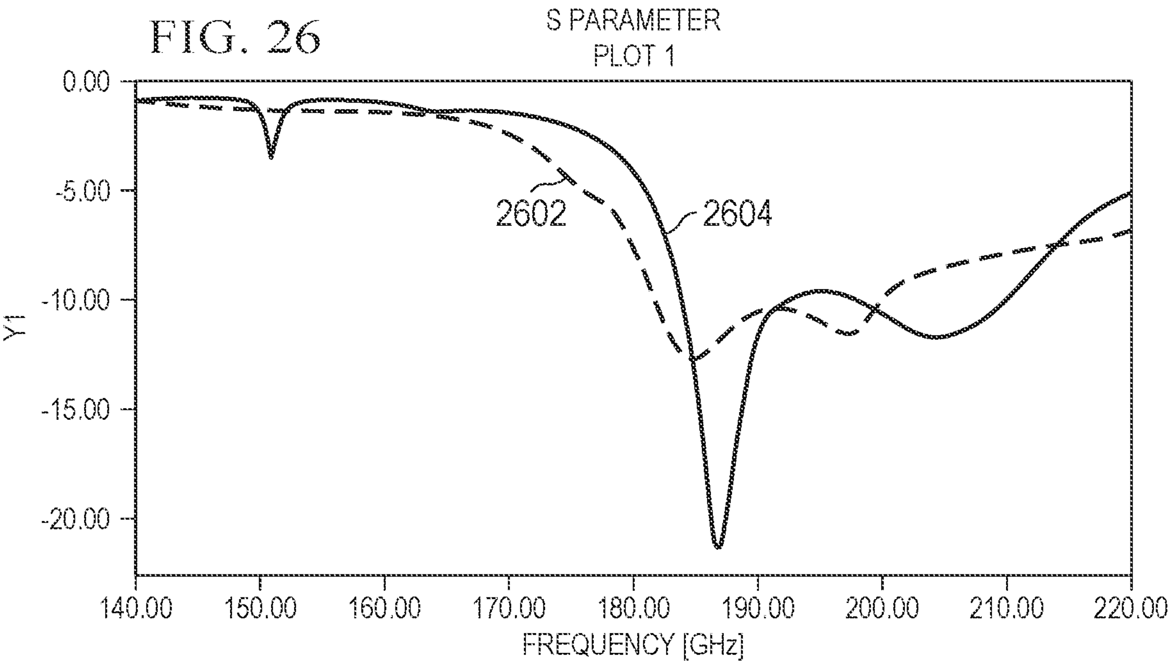
FIG. 26 is a graph showing return loss for the example AoP devices of FIGS. 2 and 5 over a range of frequencies.

FIG. 26 is a graph showing plots 2602 and 2604 of return loss for the example AoP devices 202 and 502 of FIGS. 2 and 5 over a range of frequencies. For example, the plots 2602 and 2604 show admittance over a frequency range from about 140 GHz to about 220 GHz, demonstrating that both example AoP devices 202 and 502 can achieve good bandwidth performance of about 20 GHz+ within the WR-5 band. Both antenna designs further can achieve good peak gain (e.g., maximum of about 7 dB) and radiation efficiency (e.g., maximum of about 55%).

Figure 27A:
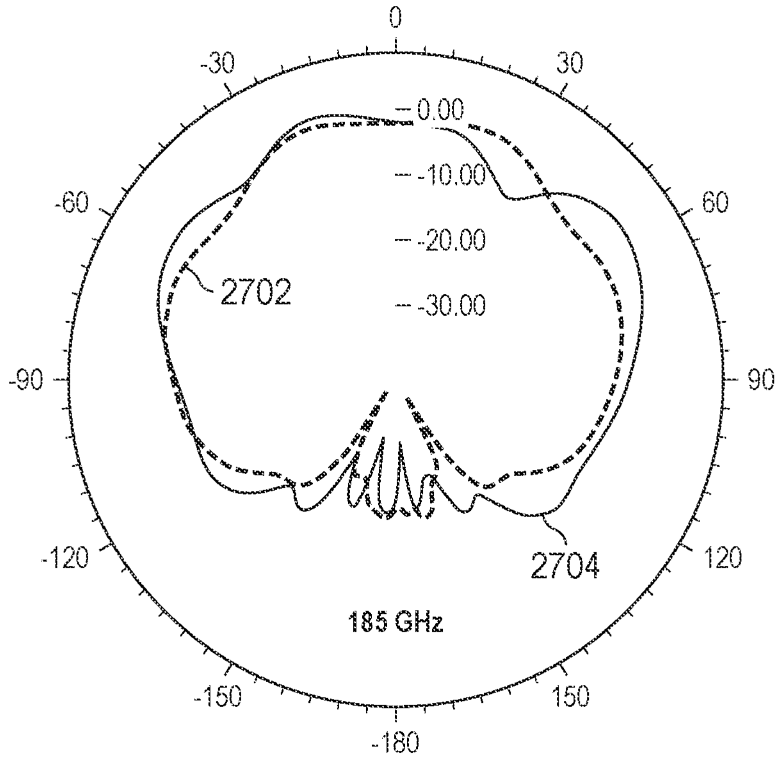
FIGS. 27A-27F are plots showing radiation patterns for the AoP device of FIG. 2 at different frequencies.
Figure 27B:
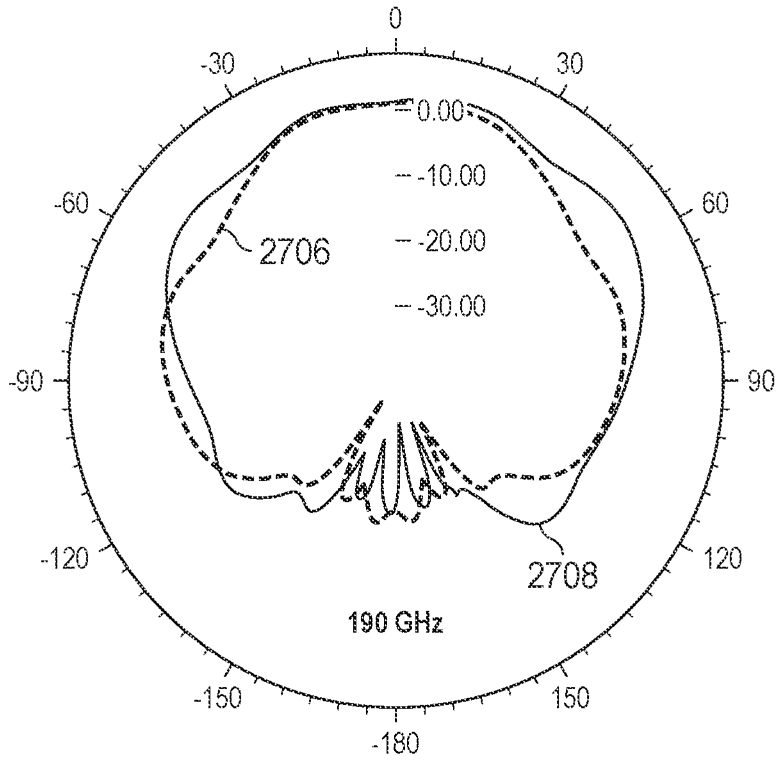
Figure 27C:
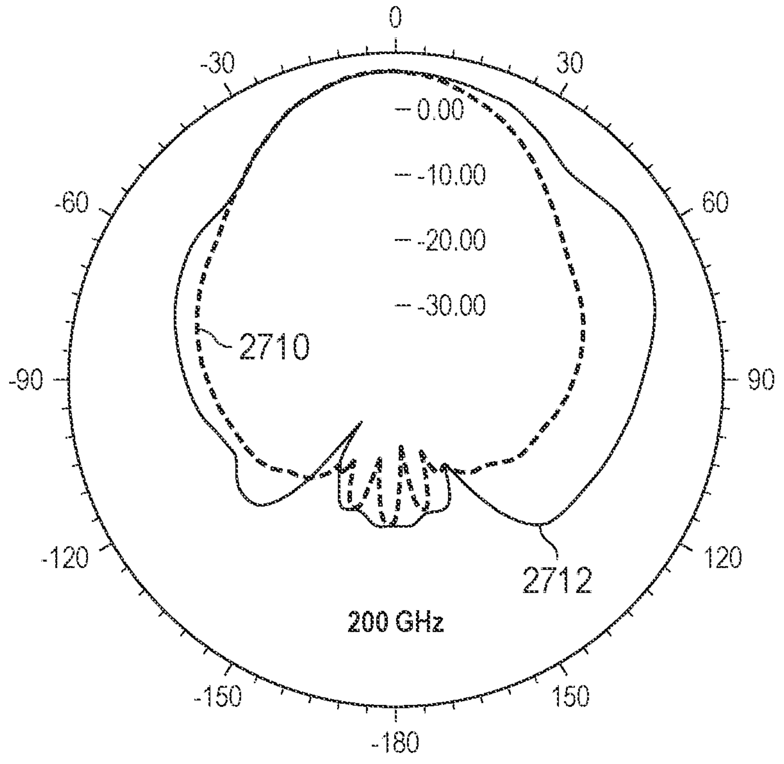
Figure 27D:
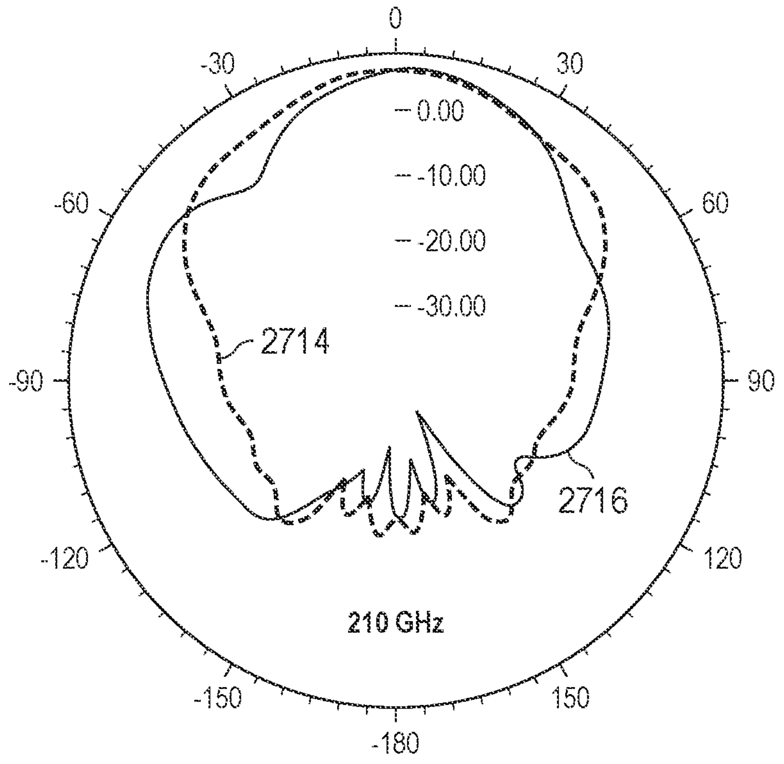
Figure 27E:
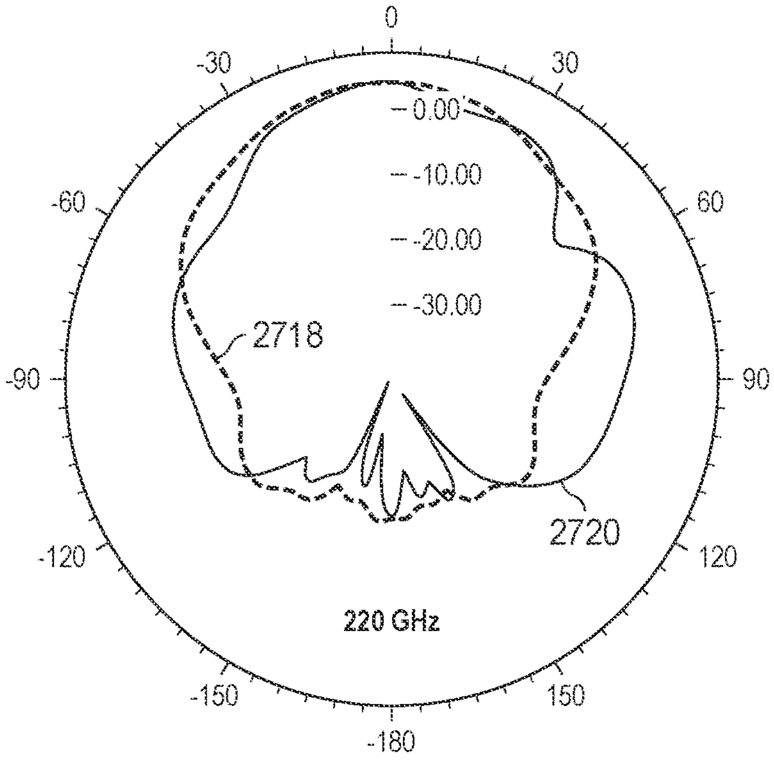
Figure 27F:
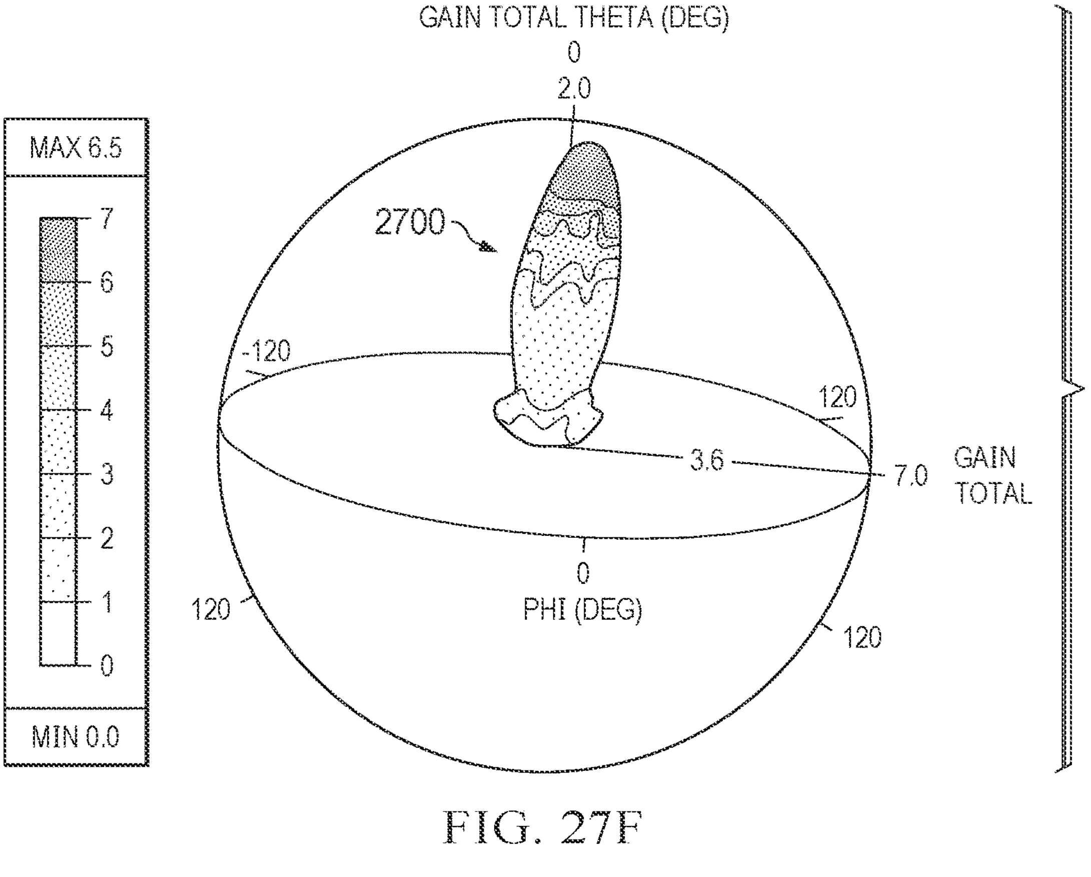

FIGS. 27A-27F are plots showing radiation patterns from a surface of the antenna 208 from a surface of the AoP device 202 of FIGS. 2-3. FIG. 27F shows a three-dimensional radiation pattern 2700, and FIGS. 27A-27E show section views through the radiation pattern 2700 at different distances from the antenna surface for different frequencies, as shown. For example, FIG. 27A shows radiation patterns 2702 and 2704 for 185 GHz. FIG. 27B shows radiation patterns 2706 and 2708 for 190 GHz. FIG. 27C shows radiation patterns 2710 and 2712 for 200 GHz. FIG. 27D shows radiation patterns 2714 and 2716 for 210 GHz, and FIG. 27E shows radiation patterns 2718 and 2720 for 220 GHz. A review of the plots of FIGS. 27A-27E demonstrates the AoP device can achieve good radiation pattern across the bandwidth, with better radiation being achieved near 210 GHz.

Figure 28A:
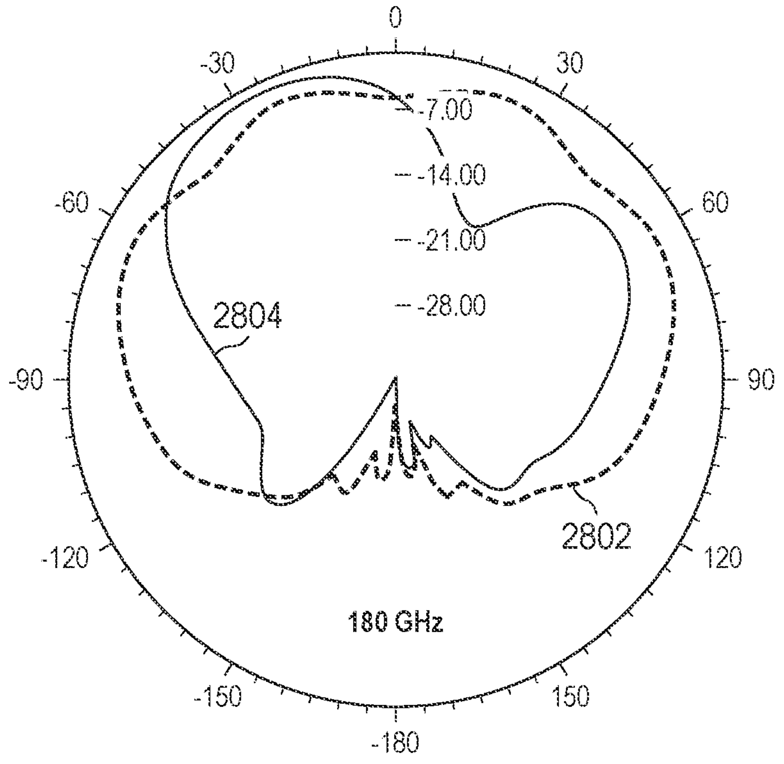
FIGS. 28A-28F are plots showing radiation patterns for the AoP device of FIG. 5 at different frequencies.
Figure 28B:
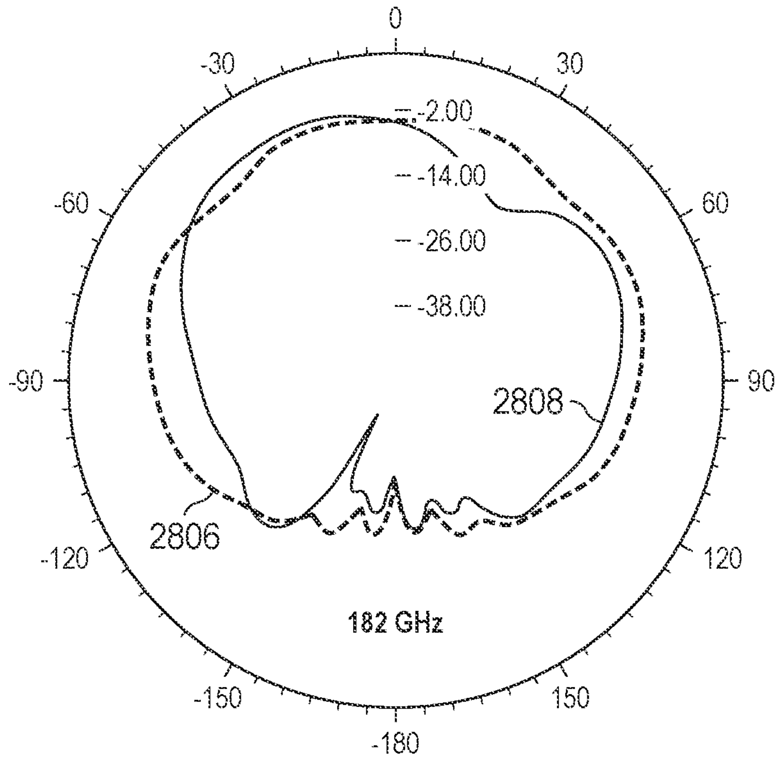
Figure 28C:
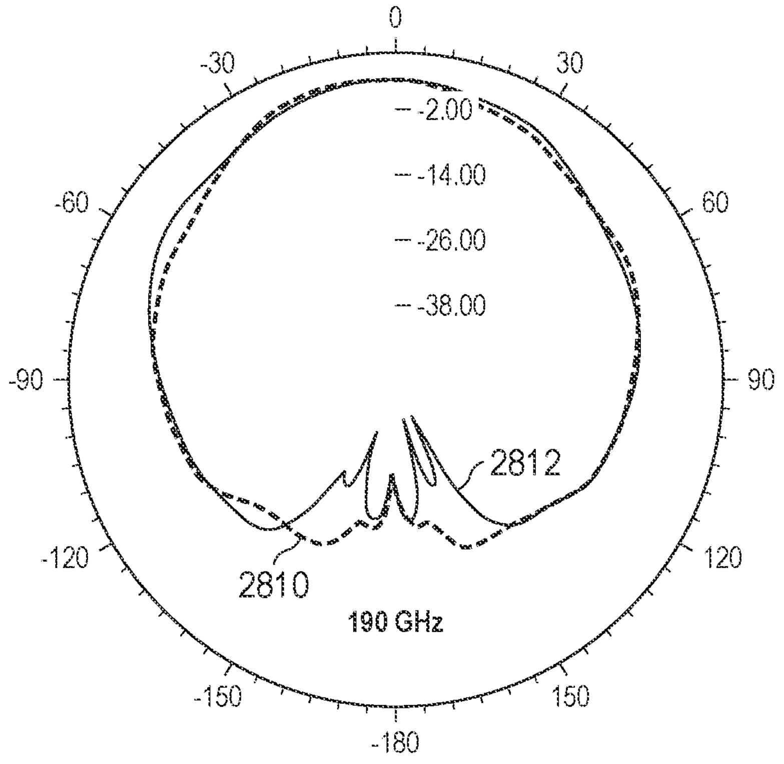
Figure 28D:
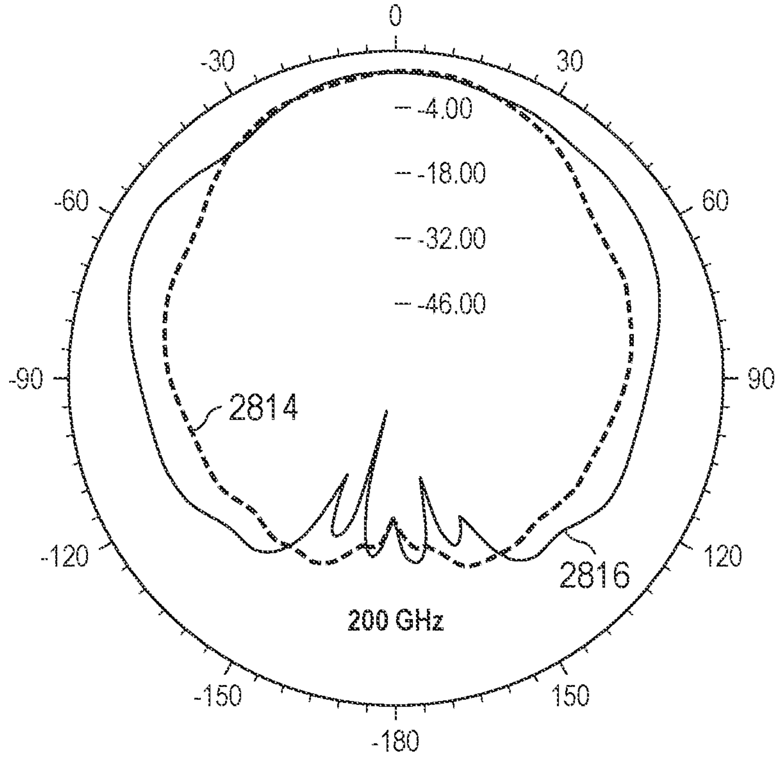
Figure 28E:
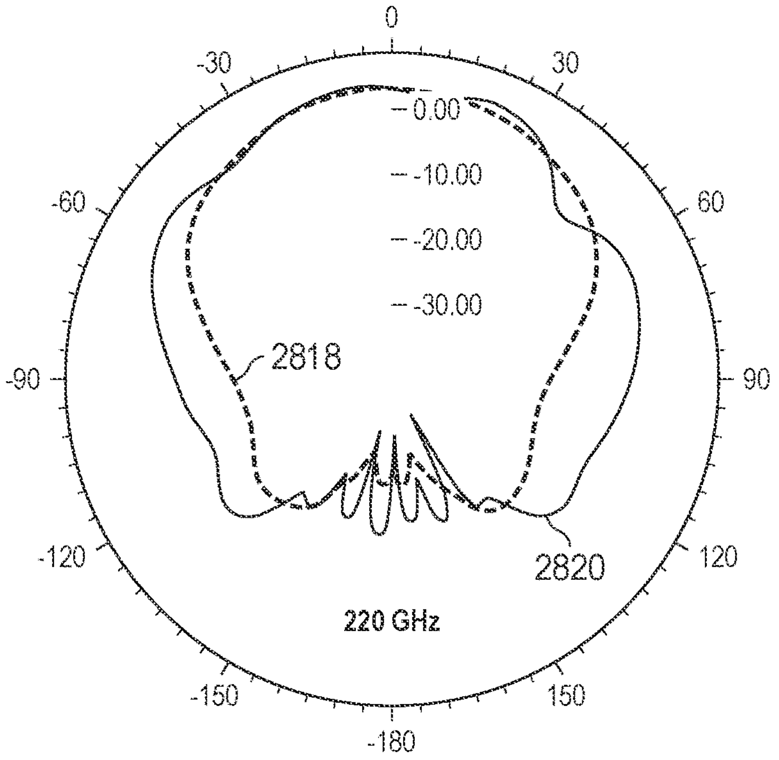
Figure 28F:
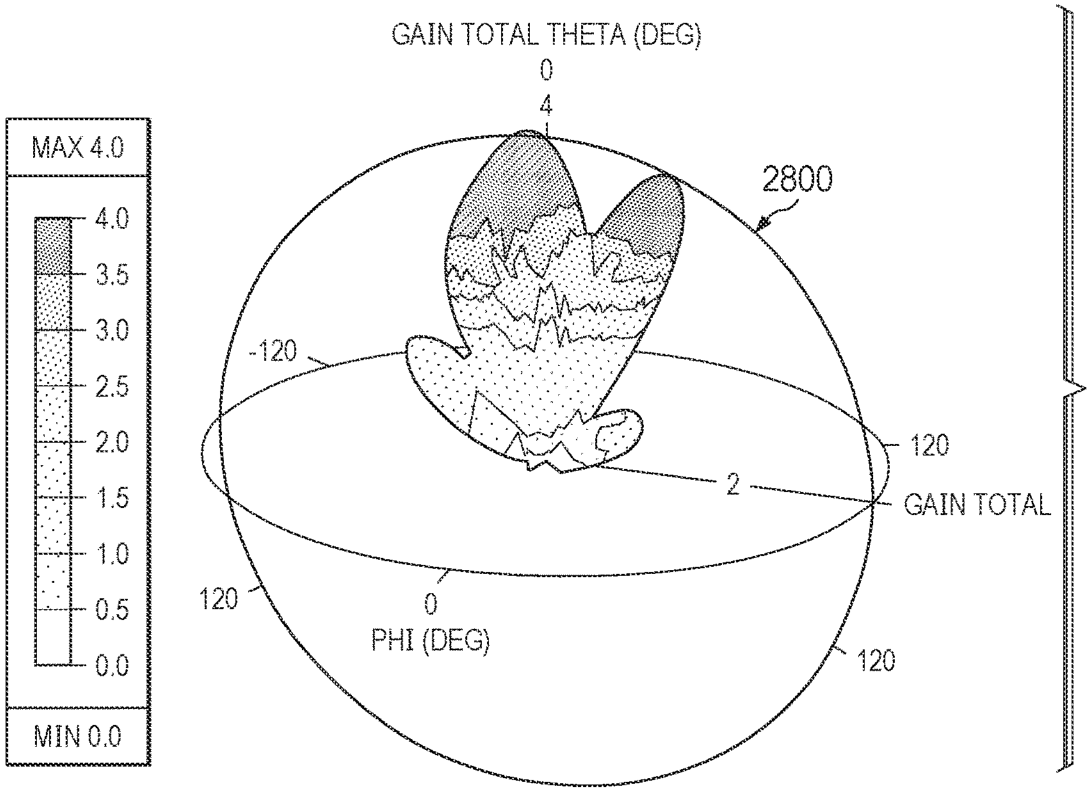

FIGS. 28A-28F are plots showing radiation patterns from a surface of the antenna 208 from a surface of the AoP device 502 of FIGS. 4-5. FIG. 28F shows a three-dimensional radiation pattern 2800, and FIGS. 28A-28E show section views through the radiation pattern 2800 at different distances from the antenna surface for different frequencies, as shown. For example, FIG. 28A shows radiation patterns

2802 and 2804 for 185 GHz. FIG. 28B shows radiation patterns 2806 and 2808 for 190 GHz. FIG. 28C shows radiation patterns 2810 and 2812 for 200 GHz. FIG. 28D shows radiation patterns 2814 and 2816 for 210 GHz, and FIG. 28E shows radiation patterns 2818 and 2820 for 220 GHz. A review of the plots of FIGS. 28A-28E demonstrates the AoP device can achieve good radiation pattern across the bandwidth, with better radiation being achieved near 220 GHz.

In this description, numerical designations "first", "second", etc. are not necessarily consistent with same designations in the claims herein. Additionally, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor wafer and/or integrated circuit (IC) package) and may be configured to couple to at least some of the passive elements and/or the sources to form the described structure, either at a time of manufacture or after a time of manufacture, such as by an end user and/or a third party.

Modifications are possible in the described embodiments, and other embodiments are possible, within the scope of the claims.

What is claimed is:

1. An antenna-on-package system comprising:

a multi-layer antenna structure, the multi-layer antenna structure comprising:

a first conductive layer comprising a patch antenna and a transmission line, the transmission line extending from a feed-side edge of the patch antenna to terminate in a launch structure; and a second conductive layer comprising a ground reflector spaced apart from the first conductive layer by a layer of dielectric material;

an integrated circuit (IC) die having a signal terminal on a surface of the IC die;

a conductive signal interconnect extending through the layer of dielectric material and coupled between the signal terminal and the launch structure;

a guard ring formed of the first conductive layer that is coplanar with the patch antenna, the guard ring being spaced apart from and surrounding the patch antenna;

a first ground interconnect extending through the layer of dielectric material and coupled between a first ground terminal of the IC die and a first guard ring end portion; and a second ground interconnect extending through the layer of dielectric material and coupled between a second ground terminal of the IC die and a second guard ring end portion.

2. The antenna-on-package system of claim 1, further comprising a plurality of conductive vias coupled between the guard ring and the ground reflector.

3. The antenna-on-package system of claim 1, wherein the patch antenna comprises an E-shaped patch antenna having a pair of notches in the feed-side edge of the patch antenna.

4. The antenna-on-package system of claim 1, wherein the transmission line extends at least partially through an opening between the first guard ring end portion and the second guard ring end portion.

5. The antenna-on-package system of claim 4, wherein the launch structure is circular-shaped, and the first and second guard ring end portions include opposing curved recessed edges along opposite sides of the circular-shaped launch structure.

6. The antenna-on-package system of claim 1, wherein the multi-layer antenna structure is configured to communicate signals having a frequency in a range from about 140 GHz to about 220 GHz.

7. The antenna-on-package system of claim 1, wherein the IC die is embedded within an insulating material, the IC die comprising at least a transmitter and/or a receiver, and the first conductive layer comprises a redistribution layer on a surface of the multi-layer antenna structure spaced apart from the surface of the IC die.

8. The antenna-on-package system of claim 1, wherein the IC die comprises interconnects on another surface of the IC die opposite of the surface having the signal terminal, the antenna-on-package system further comprising a printed circuit board coupled to the IC die by the interconnects.

9. The antenna-on-package system of claim 1, wherein the patch antenna has a periphery positioned directly over and within a virtual projection extending orthogonally of the IC die.

10. A method of forming an antenna-on-package device comprising:

forming a ground reflector patterned of a first conductive layer over a respective surface of an embedded die;

forming a layer of dielectric material over the first conductive layer;

forming a patch antenna and a transmission line of a second conductive layer over the layer of dielectric material, the transmission line extending from a feed-side edge of the patch antenna to terminate in a launch structure;

forming an interconnect between the launch structure of the transmission line and a terminal of the embedded die;

forming a guard ring of the second conductive layer, the guard ring having an inner periphery spaced outwardly from an outer periphery of the patch antenna;

forming a first ground interconnect extending through the layer of dielectric material to couple a first ground terminal of the embedded die and a first guard ring end portion; and forming a second ground interconnect extending through the layer of dielectric material to couple a second ground terminal of the embedded die and a second guard ring end portion.

11. The method of claim 10, further comprising forming a plurality of conductive vias between the guard ring and the ground reflector.

12. The method of claim 10, wherein the transmission line extends at least partially through an opening between the first guard ring end portion and the second guard ring end portion.

13. The method of claim 12, wherein the launch structure is circular-shaped, and the first and second guard ring end portions include opposing curved recessed edges formed along opposite sides of the circular-shaped launch structure.

14. The method of claim 10, wherein the patch antenna is formed as an E-shaped patch antenna having a pair of notches in the feed-side edge of the patch antenna.

15. The method of claim 10, wherein the first and second conductive layers comprise respective redistribution layers.

16. A communication system, comprising:

a printed circuit board including an arrangement of mounting terminals; and an antenna-on-package (AoP) device comprising:

a first conductive layer comprising a patch antenna and a transmission line, the transmission line extending from a feed-side edge of the patch antenna to terminate in a launch structure;

a second conductive layer comprising a ground reflector spaced apart from the first conductive layer by a layer of dielectric material;

an integrated circuit (IC) die including a signal terminal on a first surface and an arrangement of connecting terminals on a second surface opposite the first surface;

a conductive signal interconnect extending through the layer of dielectric material and coupled between the signal terminal and the launch structure;

a guard ring formed of the first conductive layer surrounding the patch antenna and at least a portion of the transmission line;

a first ground interconnect extending through the layer of dielectric material and coupled between a first ground terminal of the IC die and a first guard ring end portion; and a second ground interconnect extending through the layer of dielectric material and coupled between a second ground terminal of the IC die and a second guard ring end portion.

* * * * *